(12) United States Patent
Zewail et al.

(10) Patent No.: US 12,009,962 B2
(45) Date of Patent: Jun. 11, 2024

(54) CHANGING THE PHASE TRACKING REFERENCE SIGNAL (PTRS) PATTERN OVER DIFFERENT SYMBOLS

(71) Applicant: QUALCOMM Incorporated, San Diego, CA (US)

(72) Inventors: Ahmed Abdelaziz Ibrahim Abdelaziz Zewail, San Diego, CA (US); Zhifei Fan, San Diego, CA (US); Xiaoxia Zhang, San Diego, CA (US); Tao Luo, San Diego, CA (US); Jing Sun, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 17/448,666

(22) Filed: Sep. 23, 2021

(65) Prior Publication Data
US 2022/0109601 A1   Apr. 7, 2022

Related U.S. Application Data

(60) Provisional application No. 63/088,252, filed on Oct. 6, 2020, provisional application No. 63/088,318, filed on Oct. 6, 2020.

(51) Int. Cl.
H04L 27/26 (2006.01)
(52) U.S. Cl.
CPC .... H04L 27/2675 (2013.01); H04L 27/26025 (2021.01); H04L 27/2613 (2013.01)
(58) Field of Classification Search
None
See application file for complete search history.

(56) References Cited

U.S. PATENT DOCUMENTS 11,039,433 B2 * 6/2021 Wang ................ H04W 72/1268
11,616,665 B2 * 3/2023 Zhang ................ H04L 25/0224
370/252

(Continued)

FOREIGN PATENT DOCUMENTS

WO   2019048050 A1   3/2019

OTHER PUBLICATIONS

Ericsson: "On Phase Noise Compensation for OFDM", 3GPP TSG-RAN WG1 Meeting #102-e, 3GPP Draft, R1-2005922, 3rd Generation Partnership Project (3GPP), Mobile Competence Centre, 650, Route Des Lucioles, F-06921 Sophia-Antipolis Cedex, France, vol. RAN WG1, No. e-Meeting; Aug. 17, 2020-Aug. 28, 2020, Aug. 8, 2020 (Aug. 8, 2020), 7 Pages, XP051917815.

(Continued)

*Primary Examiner* — Otis L Thompson, Jr.
(74) *Attorney, Agent, or Firm* — Patterson & Sheridan, L.L.P.

(57) ABSTRACT

Aspects of the present disclosure can be implemented in a method for wireless communication by a first wireless node, such as a user equipment (UE) or network entity. The method generally includes identifying different patterns of phase tracking reference signal (PTRS) tones for receiving a PTRS, determining when to change at least one of the different patterns of the PTRS tones from one symbol to another, and monitoring for one or more symbols of the PTRS, from a second wireless node, according to the determination.

50 Claims, 22 Drawing Sheets

(56) References Cited

U.S. PATENT DOCUMENTS

| | | | |
|---|---|---|---|
| 2018/0205528 A1* | 7/2018 | Bai | H04L 5/0092 |
| 2018/0323933 A1 | 11/2018 | Nam et al. | |
| 2018/0324777 A1* | 11/2018 | Wang | H04L 5/1469 |
| 2019/0149295 A1* | 5/2019 | Wang | H04L 5/0051 |
| | | | 370/336 |
| 2019/0238247 A1* | 8/2019 | Lee | H04L 27/12 |
| 2019/0260466 A1* | 8/2019 | Bai | H04B 7/2603 |
| 2019/0356463 A1* | 11/2019 | Zhang | H04W 76/27 |
| 2020/0052950 A1* | 2/2020 | Manolakos | H04L 27/2657 |
| 2020/0077419 A1* | 3/2020 | Lee | H04L 5/0041 |
| 2020/0083996 A1* | 3/2020 | Hunukumbure | H04L 5/0035 |
| 2020/0153580 A1 | 5/2020 | Hessler et al. | |
| 2020/0153586 A1 | 5/2020 | Bai et al. | |
| 2020/0396047 A1* | 12/2020 | Gao | H04L 5/0051 |
| 2021/0168011 A1* | 6/2021 | Davydov | H04L 27/2675 |
| 2021/0242999 A1* | 8/2021 | Baskaran | H04L 27/261 |
| 2022/0060298 A1* | 2/2022 | Taherzadeh Boroujeni | H04L 27/2613 |
| 2022/0094496 A1* | 3/2022 | Xiong | H04W 72/0446 |
| 2022/0109601 A1* | 4/2022 | Zewail | H04L 5/0094 |
| 2023/0006794 A1* | 1/2023 | Tervo | H04L 27/2613 |
| 2023/0070783 A1* | 3/2023 | Hui | H04L 1/1825 |
| 2023/0275715 A1* | 8/2023 | Paz | H04L 5/0048 |
| | | | 370/329 |

OTHER PUBLICATIONS

International Search Report and Written Opinion—PCT/US2021/071577—ISA/EPO—dated Jan. 24, 2022.

* cited by examiner

500

| Scheduled MCS | Time Density ($L_{PT-RS}$) |
|---|---|
| $I_{MCS}$ < ptrs-MCS1 | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

Time density of a PT-RS as a function of scheduled MCS

| Scheduled Bandwidth | Frequency Density ($K_{PT-RS}$) (1/n) |
|---|---|
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ | 4 |

Frequency density of a PT-RS as a function of scheduled bandwidth

| DM-RS antenna port | DM-RS Configuration type 1 | | | | DM-RS Configuration type 2 | | | |
|---|---|---|---|---|---|---|---|---|
| | *resourceElementOffset* | | | | *resourceElementOffset* | | | |
| | offset00 | offset01 | offset10 | offset11 | offset00 | offset01 | offset10 | offset11 |
| 0 | 0 | 2 | 6 | 8 | 0 | 1 | 6 | 7 |
| 1 | 2 | 4 | 8 | 10 | 1 | 6 | 7 | 0 |
| 2 | 1 | 3 | 7 | 9 | 2 | 3 | 8 | 9 |
| 3 | 3 | 5 | 9 | 11 | 3 | 8 | 9 | 2 |
| 4 | - | - | - | - | 4 | 5 | 10 | 11 |
| 5 | - | - | - | - | 5 | 10 | 11 | 4 |

| DM-RS antenna port | DM-RS Configuration type 1 | | | | DM-RS Configuration type 2 | | | |
|---|---|---|---|---|---|---|---|---|
| | *resourceElementOffset* | | | | *resourceElementOffset* | | | |
| | offset00 | offset01 | offset10 | offset11 | offset00 | offset01 | offset10 | offset11 |
| 1000 | 0 | 2 | 6 | 8 | 0 | 1 | 6 | 7 |
| 1001 | 2 | 4 | 8 | 10 | 1 | 6 | 7 | 0 |
| 1002 | 1 | 3 | 7 | 9 | 2 | 3 | 8 | 9 |
| 1003 | 3 | 5 | 9 | 11 | 3 | 8 | 9 | 2 |
| 1004 | - | - | - | - | 4 | 5 | 10 | 11 |
| 1005 | - | - | - | - | 5 | 10 | 11 | 4 |

FIG. 7B

CHANGING THE PHASE TRACKING REFERENCE SIGNAL (PTRS) PATTERN OVER DIFFERENT SYMBOLS

CROSS-REFERENCE TO RELATED APPLICATION

This application claims benefit of and priority to U.S. Provisional Application No. 63/088,252 filed Oct. 6, 2020 and U.S. Provisional Application No. 63/088,318 filed Oct. 6, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for changing the phase tracking reference signal (PTRS) pattern over different symbols.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or a DU may communicate with a set of UEs on downlink channels (e.g., for transmissions from the BS or the DU to the UE) and uplink channels (e.g., for transmissions from the UE to the BS or the DU).

These multiple access technologies have been adopted in various telecommunication standards to provide a common protocol that enables different wireless devices to communicate on a municipal, national, regional, and even global level. The NR (e.g., new radio or 5G) is an example of an emerging telecommunication standard. The NR is a set of enhancements to the LTE mobile standard promulgated by 3GPP. The NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, the NR supports beamforming, multiple-input multiple-output (MIMO) antenna technology, and carrier aggregation.

As the demand for mobile broadband access continues to increase, there exists a need for further improvements in the NR and the LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved techniques for changing the phase tracking reference signal (PTRS) pattern over different symbols and techniques for using PTRS recommendations for intercarrier interference (ICI) compensation.

Certain aspects of the subject matter described in this disclosure can be implemented in a method for wireless communications by a first wireless node. The method generally includes identifying different patterns of phase tracking reference signal (PTRS) tones to monitor for a PTRS; determining when to change at least one of the different patterns of the PTRS tones from one symbol to another; and monitoring for one or more symbols of the PTRS, from a second wireless node, according to the determination.

Certain aspects of the subject matter described in this disclosure can be implemented in a method for wireless communication by a first wireless node. The method generally includes identifying different patterns of PTRS tones for transmitting a PTRS; determining when to change at least one of the different patterns of the PTRS tones from one symbol to another; and transmitting one or more symbols of the PTRS, to a second wireless node, according to the determination.

Certain aspects of the subject matter described in this disclosure can be implemented in a method for wireless communication by a first wireless node. The method generally includes transmitting, to a second wireless node, a recommendation indicating at least a recommended offset for PTRS tones for use in determining a location of at least a first PTRS tone; receiving a PTRS transmitted on the PTRS tones, including the first PTRS tone, in accordance with the determination; and estimating filter coefficients for a de-intercarrier interference (de-ICI) filter based on the PTRS received on the PTRS tones.

Certain aspects of the subject matter described in this disclosure can be implemented in a method for wireless communication by a first wireless node. The method generally includes receiving, from a second wireless node, a recommendation indicating at least a recommended offset for PTRS tones; determining a location of at least a first PTRS tone based, at least in part, on the recommended offset; and transmitting a PTRS on one or more PTRS tones, including the first PTRS tone, in accordance with the determination.

Certain aspects of the subject matter described in this disclosure can be implemented in a method for wireless communication by a first wireless node. The method generally includes transmitting, to a second wireless node, a recommendation indicating at least a recommended number of PTRS tones for use in determining a location of at least a first PTRS tone; receiving a PTRS transmitted on the PTRS tones, including the first PTRS tone, in accordance with the determination; and estimating filter coefficients for a de-ICI filter based on the PTRS received on the PTRS tones.

Certain aspects of the subject matter described in this disclosure can be implemented in a method for wireless communication by a first wireless node. The method generally includes receiving, from a second wireless node, a recommendation indicating at least a recommended number of PTRS tones; determining a number of PTRS tones based, at least in part on the recommended number; and transmitting a PTRS on one or more PTRS tones, in accordance with the determination.

Certain aspects of the subject matter described in this disclosure can be implemented in an apparatus for wireless communication by a first wireless node. The apparatus generally includes a memory and one or more processors coupled to the memory, the memory and the one or more processors being configured to: identify different patterns of PTRS tones to monitor for a PTRS; determine when to change at least one of the different patterns of the PTRS tones from one symbol to another; and monitor for one or more symbols of the PTRS, from a second wireless node, according to the determination.

Certain aspects of the subject matter described in this disclosure can be implemented in an apparatus for wireless communication by a first wireless node. The apparatus generally includes a memory and one or more processors coupled to the memory, the memory and the one or more processors being configured to: identify different patterns of PTRS tones for transmitting a PTRS; determine when to change at least one of the different patterns of the PTRS tones from one symbol to another; and transmit one or more symbols of the PTRS, to a second wireless node, according to the determination.

Certain aspects of the subject matter described in this disclosure can be implemented in an apparatus for wireless communication by a first wireless node. The apparatus generally includes a memory and one or more processors coupled to the memory, the memory and the one or more processors being configured to: transmit, to a second wireless node, a recommendation indicating at least a recommended offset for PTRS tones for use in determining a location of at least a first PTRS tone; receive a PTRS transmitted on the PTRS tones, including the first PTRS tone, in accordance with the determination; and estimate filter coefficients for a de-ICI filter based on the PTRS received on the PTRS tones.

Certain aspects of the subject matter described in this disclosure can be implemented in an apparatus for wireless communication by a first wireless node. The apparatus generally includes a memory and one or more processors coupled to the memory, the memory and the one or more processors being configured to: receive, from a second wireless node, a recommendation indicating at least a recommended offset for PTRS tones; determine a location of at least a first PTRS tone based, at least in part, on the recommended offset; and transmit a PTRS on one or more PTRS tones, including the first PTRS tone, in accordance with the determination.

Certain aspects of the subject matter described in this disclosure can be implemented in an apparatus for wireless communication by a first wireless node. The apparatus generally includes a memory and one or more processors coupled to the memory, the memory and the one or more processors being configured to: transmit, to a second wireless node, a recommendation indicating at least a recommended number of PTRS tones for use in determining a location of at least a first PTRS tone; receive a PTRS transmitted on the PTRS tones, including the first PTRS tone, in accordance with the determination; and estimate filter coefficients for a de-ICI filter based on the PTRS received on the PTRS tones.

Certain aspects of the subject matter described in this disclosure can be implemented in an apparatus for wireless communication by a first wireless node. The apparatus generally includes a memory and one or more processors coupled to the memory, the memory and the one or more processors being configured to: receive, from a second wireless node, a recommendation indicating at least a recommended number of PTRS tones; determine a number of PTRS tones based, at least in part on the recommended number; and transmit a PTRS on one or more PTRS tones, in accordance with the determination.

Certain aspects of the subject matter described in this disclosure can be implemented in an apparatus for wireless communication by a first wireless node. The apparatus generally includes means for identifying different patterns of PTRS tones to monitor for a PTRS; means for determining when to change at least one of the different patterns of the PTRS tones from one symbol to another; and means for monitoring for one or more symbols of the PTRS, from a second wireless node, according to the determination.

Certain aspects of the subject matter described in this disclosure can be implemented in an apparatus for wireless communication by a first wireless node. The apparatus generally includes means for identifying different patterns of PTRS tones for transmitting a PTRS; means for determining when to change at least one of the different patterns of the PTRS tones from one symbol to another; and means for transmitting one or more symbols of the PTRS, to a second wireless node, according to the determination.

Certain aspects of the subject matter described in this disclosure can be implemented in an apparatus for wireless communication by a first wireless node. The apparatus generally includes means for transmitting, to a second wireless node, a recommendation indicating at least a recommended offset for PTRS tones for use in determining a location of at least a first PTRS tone; means for receiving a PTRS transmitted on the PTRS tones, including the first PTRS tone, in accordance with the determination; and means for estimating filter coefficients for a de-ICI filter based on the PTRS received on the PTRS tones.

Certain aspects of the subject matter described in this disclosure can be implemented in an apparatus for wireless communication by a first wireless node. The apparatus generally includes means for receiving, from a second wireless node, a recommendation indicating at least a recommended offset for PTRS tones; means for determining a location of at least a first PTRS tone based, at least in part, on the recommended offset; and means for transmitting a PTRS on one or more PTRS tones, including the first PTRS tone, in accordance with the determination.

Certain aspects of the subject matter described in this disclosure can be implemented in an apparatus for wireless communication by a first wireless node. The apparatus generally includes means for transmitting, to a second wireless node, a recommendation indicating at least a recommended number of PTRS tones for use in determining a location of at least a first PTRS tone; means for receiving a PTRS transmitted on the PTRS tones, including the first PTRS tone, in accordance with the determination; and means for estimating filter coefficients for a de-ICI filter based on the PTRS received on the PTRS tones.

Certain aspects of the subject matter described in this disclosure can be implemented in an apparatus for wireless communication by a first wireless node. The apparatus generally includes means for receiving, from a second wireless node, a recommendation indicating at least a recommended number of PTRS tones; means for determining a number of PTRS tones based, at least in part on the recommended number; and means for transmitting a PTRS on one or more PTRS tones, in accordance with the determination.

Certain aspects of the subject matter described in this disclosure provide a non-transitory computer-readable medium comprising executable instructions that, when executed by one or more processors of a first wireless node, cause the first wireless node to: identify different patterns of PTRS tones to monitor for a PTRS; determine when to change at least one of the different patterns of the PTRS tones from one symbol to another; and monitor for one or more symbols of the PTRS, from a second wireless node, according to the determination.

Certain aspects of the subject matter described in this disclosure provide a non-transitory computer-readable medium comprising executable instructions that, when executed by one or more processors of a first wireless node, cause the first wireless node to: identify different patterns of PTRS tones for transmitting a PTRS; determine when to change at least one of the different patterns of the PTRS tones from one symbol to another; and transmit one or more symbols of the PTRS, to a second wireless node, according to the determination.

Certain aspects of the subject matter described in this disclosure provide a non-transitory computer-readable medium comprising executable instructions that, when executed by one or more processors of a first wireless node, cause the first wireless node to: transmit, to a second wireless node, a recommendation indicating at least a recommended offset for PTRS tones for use in determining a location of at least a first PTRS tone; receive a PTRS transmitted on the PTRS tones, including the first PTRS tone, in accordance with the determination; and estimate filter coefficients for a de-ICI filter based on the PTRS received on the PTRS tones.

Certain aspects of the subject matter described in this disclosure provide a non-transitory computer-readable medium comprising executable instructions that, when executed by one or more processors of a first wireless node, cause the first wireless node to: receive, from a second wireless node, a recommendation indicating at least a recommended offset for PTRS tones; determine a location of at least a first PTRS tone based, at least in part, on the recommended offset; and transmit a PTRS on one or more PTRS tones, including the first PTRS tone, in accordance with the determination.

Certain aspects of the subject matter described in this disclosure provide a non-transitory computer-readable medium comprising executable instructions that, when executed by one or more processors of a first wireless node, cause the first wireless node to: transmit, to a second wireless node, a recommendation indicating at least a recommended number of PTRS tones for use in determining a location of at least a first PTRS tone; receiving a PTRS transmitted on the PTRS tones, including the first PTRS tone, in accordance with the determination; and estimate filter coefficients for a de-ICI filter based on the PTRS received on the PTRS tones.

Certain aspects of the subject matter described in this disclosure provide a non-transitory computer-readable medium comprising executable instructions that, when executed by one or more processors of a first wireless node, cause the first wireless node to: receive, from a second wireless node, a recommendation indicating at least a recommended number of PTRS tones; determine a number of PTRS tones based, at least in part on the recommended number; and transmit a PTRS on one or more PTRS tones, in accordance with the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 illustrates an example table of a time density of phase tracking reference signals (PTRSs) as a function of a scheduled modulation and coding scheme (MCS), in accordance with certain aspects of the present disclosure.

FIG. 6 illustrates an example table of a frequency density of PTRSs as a function of a scheduled bandwidth, in accordance with certain aspects of the present disclosure.

FIGS. 7A and 7B illustrate example tables of subcarrier offsets for uplink (UL) PTRS and downlink (DL) PTRS, respectively, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
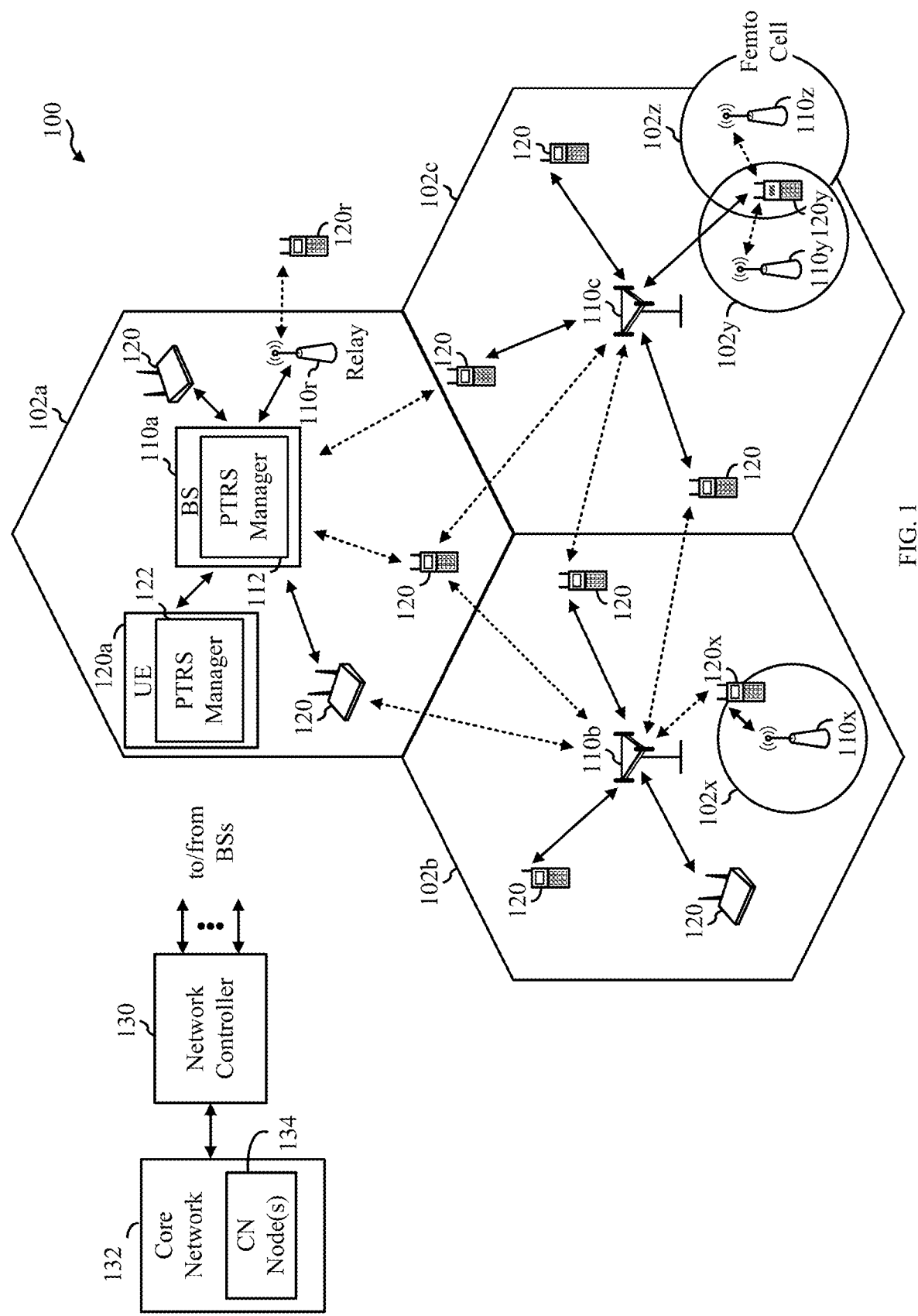
FIG. 1 is a block diagram conceptually illustrating an example wireless system, in accordance with certain aspects of the present disclosure.

Aspects of the present disclosure provide improved techniques for efficiently using phase tracking reference signals (PTRSs). As will be described, determining when to change PTRS patterns from one symbol to another may allow for different combinations of phase noise (PN) compensations schemes.

For example, the operations described herein may be performed by a user equipment (UE) to transmit uplink (UL) PTRS and/or receive downlink (DL) PTRS. Similarly, the operations described herein may be performed on the network side (e.g., by a base station (BS) such as an evolved NodeB (eNB)/next generation NodeB (gNB)) to transmit DL PTRS and/or receive UL PTRS.

In some aspects, the UE and/or network entity may estimate filter coefficients for a direct de-intercarrier interference (de-ICI) filter utilizing the identified PTRS patterns over the different symbols, where each identified PTRS pattern has offset PTRS tones to establish a certain number of tones on top of a first PTRS tone in the PTRS.

The following description provides examples of the techniques for changing the PTRS pattern over different symbols, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G New Radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations: frequency range 1 (FR1) (410 megahertz (MHz)-7.125 gigahertz (GHz)) and frequency range 2 (FR2) (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. Multiple-input multiple-output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, wireless communication network 100 may include a user equipment (UE), such as UE 120a (with a phase tracking reference signal (PTRS) manager 122) that may be configured to perform operations 1000 of FIG. 10, operations 1100 of FIG. 11, operations 1400 of FIG. 14, operations 1500 of FIG. 15, operations 1800 of FIG. 18, and/or operations 1900 of FIG. 19. Similarly, wireless communication network 100 may include a network entity, such as base station (BS) 110a (with a PTRS manager 112) that may be configured to perform operations 1000 of FIG. 10, operations 1100 of FIG. 11, operations 1400 of FIG. 14, operations 1500 of FIG. 15, operations 1800 of FIG. 18, and/or operations 1900 of FIG. 19.

As shown in FIG. 1, wireless communication network 100 may be in communication with a core network 132. Core network 132 may in communication with one or more BSs 110a-z (each also individually referred to herein as BS 110 or collectively as BSs 110) and/or UEs 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, BSs 110 may be interconnected to one another and/or to one or more other BSs 110 or network nodes (not shown) in wireless communication network 100 through various types of backhaul interfaces (e.g., a direct physical connection, a wireless connection, a virtual network, or the like) using any suitable transport network. In the example shown in FIG. 1, BSs 110a, 110b and 110c may be macro BSs for the macro cells 102a, 102b and 102c, respectively. BS 110x may be a pico BS for a pico cell 102x. BSs 110y and 110z may be femto BSs for the femto cells 102y and 102z, respectively. A BS 110 may support one or multiple cells.

BSs 110 communicate with UEs 120 in wireless communication network 100. UEs 120 (e.g., 120x, 120y, etc.) may be dispersed throughout wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
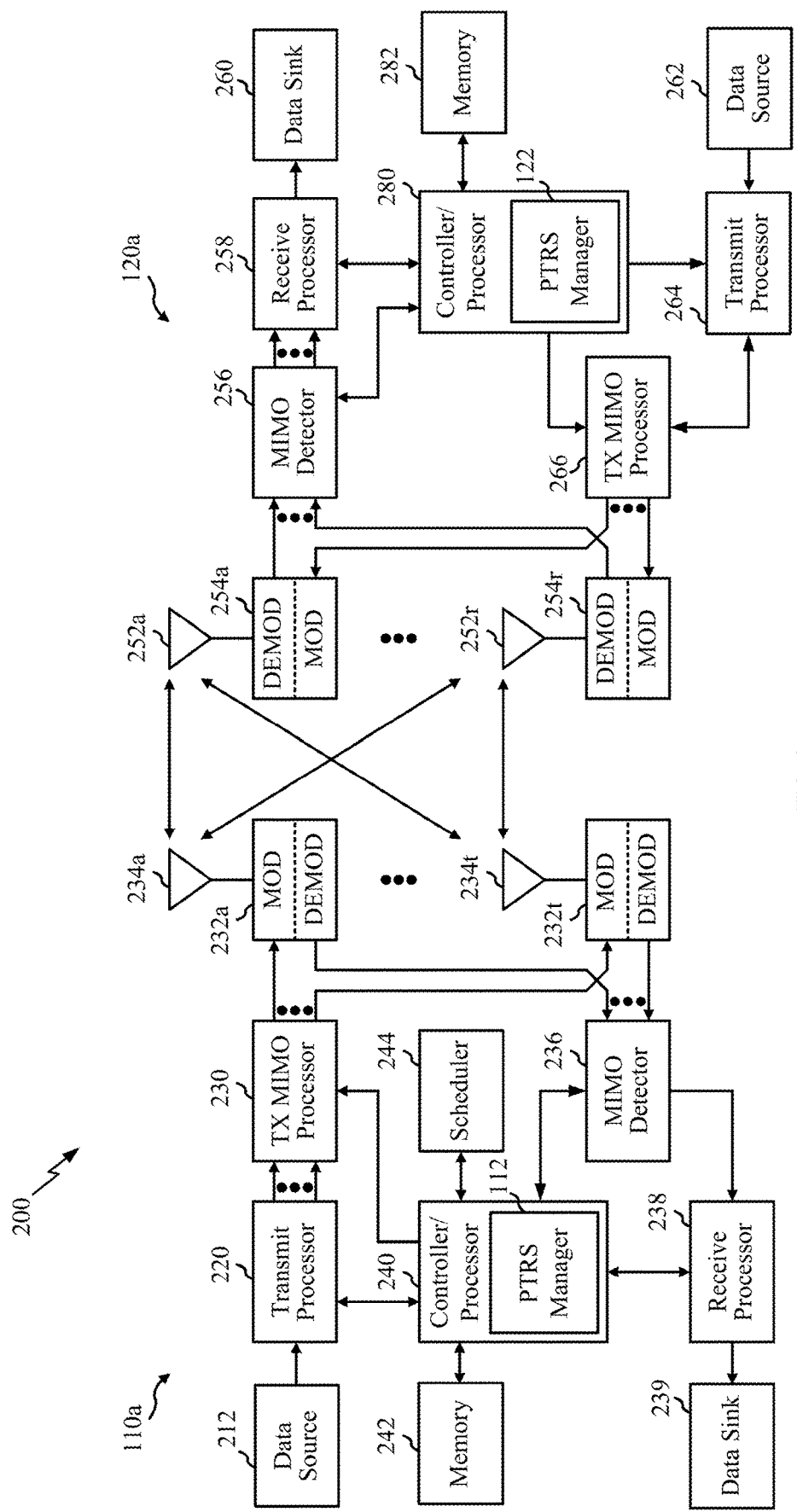
FIG. 2 illustrates example components of a network entity and a user equipment (UE), in accordance with certain aspects of the present disclosure.

FIG. 2 illustrates example components of BS 110a and UE 120a (e.g., in wireless communication network 100 of FIG. 1), which may be used to implement aspects of the present disclosure.

At BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. A medium access control (MAC)-control element (CE) (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a downlink (DL) signal. DL signals from the modulators in transceivers 232a-232t may be transmitted via antennas 234a-234t, respectively.

At UE 120a, antennas 252a-252r may receive the DL signals from BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for UE 120a to a data sink 260, and provide decoded control information to a controller/processor 280.

On the uplink (UL), at UE 120a, a transmit processor 264 may receive and process data (e.g., for the PUSCH) from a data source 262 and control information (e.g., for the physical uplink control channel (PUCCH) from the controller/processor 280. Transmit processor 264 may also generate reference symbols for a reference signal (RS) (e.g., for the sounding reference signal (SRS)). The symbols from transmit processor 264 may be precoded by a TX MIMO processor 266 if applicable, further processed by the modulators in transceivers 254a-254r (e.g., for single-carrier frequency division multiplexing (SC-FDM), etc.), and transmitted to BS 110a. At BS 110a, the UL signals from UE 120a may be received by the antennas 234, processed by the demodulators in transceivers 232a-232t, detected by a MIMO detector 236 if applicable, and further processed by a receive processor 238 to obtain decoded data and control information sent by UE 120a. Receive processor 238 may provide the decoded data to a data sink 239 and the decoded control information to controller/processor 240.

Memories 242 and 282 may store data and program codes for BS 110a and UE 120a, respectively. A scheduler 244 may schedule UEs for data transmission on the DL and/or UL.

Antennas 252, processors 266, 258, 264, and/or controller/processor 280 of UE 120a and/or antennas 234, processors 220, 230, 238, and/or controller/processor 240 of BS 110a may be used to perform the various techniques and methods described herein. For example, as shown in FIG. 2, controller/processor 240 of BS 110a has a PTRS manager 112 that may be configured to perform operations 1000 of FIG. 10, operations 1100 of FIG. 11, operations 1400 of FIG. 14, operations 1500 of FIG. 15, operations 1800 of FIG. 18, and/or operations 1900 of FIG. 19. Similarly, as shown in FIG. 2, controller/processor 280 of UE 120a has a PTRS manager 122 configured to perform operations 1000 of FIG. 10, operations 1100 of FIG. 11, operations 1400 of FIG. 14, operations 1500 of FIG. 15, operations 1800 of FIG. 18, and/or operations 1900 of FIG. 19. Although shown at the controller/processor, other components of UE 120a and BS 110a may be used to perform the operations described herein.

NR may utilize OFDM with a cyclic prefix (CP) on the UL and DL. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kilohertz (KHz) and other SCS may be defined with respect to the base SCS (e.g., 30 kHz, 60 kHz, 120 kHz, 240 kHz, etc.).

Figure 3:
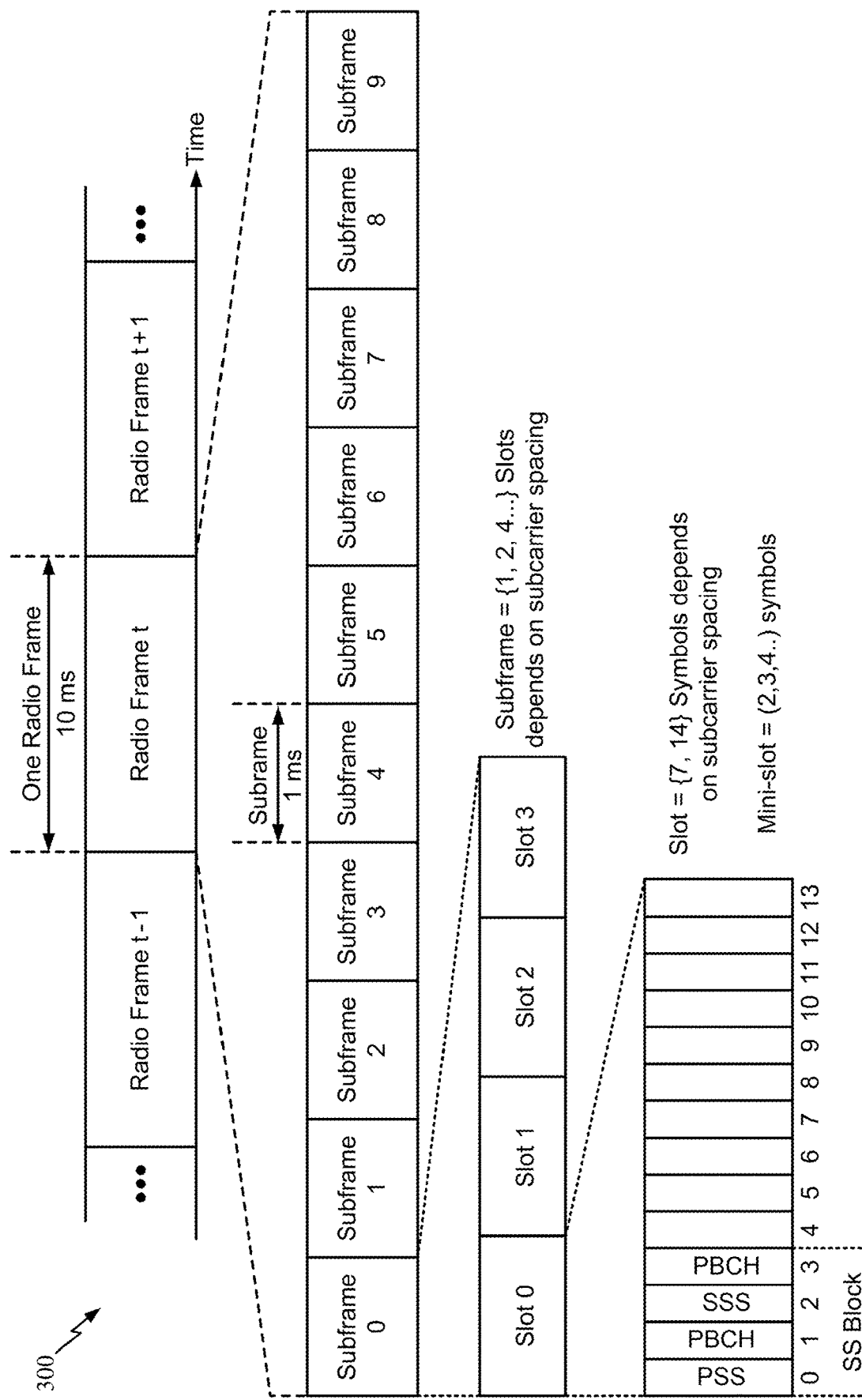
FIG. 3 is a block diagram is a diagram illustrating an example of a frame format for a new radio (NR), in accordance with certain aspects of the present disclosure.

FIG. 3 is a diagram showing an example of a frame format 300 for NR, in accordance with certain aspects of the present disclosure. The transmission timeline for each of DL and UL may be partitioned into units of radio frames. Each radio frame may have a predetermined duration (e.g., 10 milliseconds (ms)) and may be partitioned into 10 subframes, each of 1 ms, with indices of 0 through 9. Each subframe may include a variable number of slots depending on SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., the DL, the UL, or flexible) for data transmission and the link direction for each subframe may be dynamically switched. The link directions may be based on a slot format. Each slot may include DL/UL data as well as DL/UL control information.

In the NR, a synchronization signal block (SSB) is transmitted. The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, and the SSS may provide CP length and frame timing. The PSS and the SSS may provide cell identity. The PBCH carries some basic system information, such as DL system bandwidth, timing information within radio frame, synchronization signal (SS) burst set periodicity, system frame number, etc. The SSBs may be organized into SS bursts to support beam sweeping. Further system information such as, remaining minimum system information (RMSI), system information blocks (SIBs) such as system information block type 1 (SIB1), other system information (OSI) can be transmitted on a PDSCH in certain subframes. The SSB can be transmitted up to sixty-four times, for example, with up to sixty-four different beam directions for mmW. The up to sixty-four transmissions of the SSB are referred to as the SS burst set. The SSBs in an SS burst set are transmitted in a same frequency region, while the SSBs in different SS bursts sets can be transmitted at different frequency locations.

Example Phase Tracking Reference Signal (PTRS)
Design for Inter-Carrier Interference (ICI)

5G New Radio (NR) is a global 5G standard for a new orthogonal frequency division multiplex (OFDM)-based air interface designed to support the wide variation of 5G device-types, services, deployments, and spectrum. One transformation taking place with 5G NR is the move towards higher millimeter wave (mmWave) frequencies as an approach to significantly boost the capacity of 5G. However, mmWave devices and network access points (APs) may suffer from severe phase noise (PN) (e.g., small random phase variations) due, at least in part, to the mismatch of transmitter and receiver frequency oscillators. Random PN and frequency offset are generated by non-ideal oscillators at both receiver and transmitter. In other words, PN is caused by noise in the active components and lossy elements which is up-converted to the carrier frequency.

Uncompensated PN leads to common phase error (CPE) and inter-carrier interference (ICI) (also referred to as inter-symbol-interference) related error. PN related ICI is prevalent in most high signal-to-noise ratio (SNR) regions which are associated with high modulation and coding scheme (MCS) options and high modulation orders. ICI taps represent the frequency domain PN response. ICI taps may be different per symbol, but are the same for all resource elements (REs). Further, ICIs taps are typically the same for all receive (RX)/transmit (TX) antennas.

In this regard, phase tracking reference signals (PTRSs) were introduced as PN mitigation pilots in 3rd Generation Partnership Project (3GPP) Release 15. In particular, PTRSs may track a phase of an oscillator at a transmitter and a receiver of a node and mitigate the performance loss due to the PN. The terms PTRSs and PTRS tones may be used interchangeably herein.

For example, in some wireless communication systems having a UE and a base station (BS), the BS may have a good phase coherence across its one or more antenna ports. The UE UL transmission with two or more oscillators may be full-coherent, partial-coherent, or non-coherent in phase. In such wireless communication systems, PTRSs may be used for PN estimation. The PTRSs may track a phase of an oscillator at a transmitter and a receiver of the UE. The phase tracking may enable suppression of PN impacts, such as CPE, particularly at higher (e.g., mmWave) frequencies.

Figure 4:
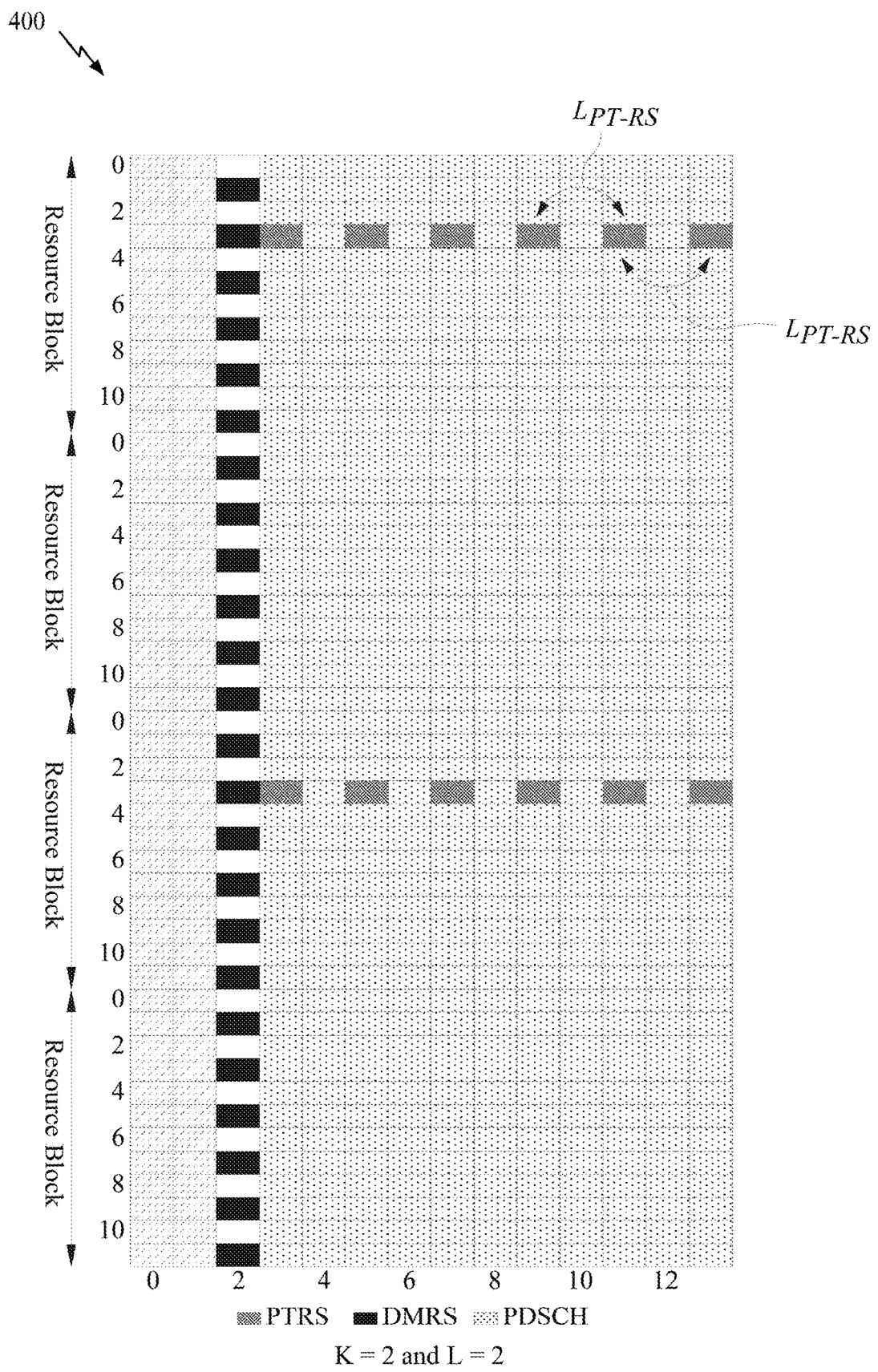
FIG. 4 illustrates example of PTRS tones in a resource block, in accordance with certain aspects of the present disclosure.

In 3GPP Release 16 5G NR, the PTRS may be present in a resource block (RB). FIG. 4 illustrates an example 400 of PTRS tones in an RB, in accordance with certain aspects of the present disclosure. As shown in FIG. 4, with a TimeDensity, $L_{PT-RS}$ (also referred to as parameter L), of two, one PTRS tone is sent every two symbols, and with a FrequencyDensity, $K_{PT-RS}$ (also referred to as parameter K), of two, one PTRS tone is sent every two RBs.

Time domain and frequency domain resources for the PTRSs (e.g., PTRS tones) may be dynamically determined. For example, for single user multiple-input multiple-output (SU-MIMO), radio resource control (RRC) signaling may provide predefined configurations for the PTRS based on a TimeDensity ($L_{PT-RS}$) and FrequencyDensity ($K_{PT-RS}$), which may be specified by parameters L and K, respectively. The signaling may be provided via PTRS-DownlinkConfig and PTRS-UplinkConfig. For example, the time density may be associated with and determined by a scheduled modulation and coding scheme (MCS), while the frequency density may be associated with and determined by a scheduled bandwidth (e.g., in number of RBs).

FIG. 5 illustrates an example table of time density parameters for PTRSs, in accordance with certain aspects of the present disclosure. As shown in Table 500 of FIG. 5, the time density of a PTRS may be determined as a function of scheduled MCS. In particular, TimeDensity, parameter L, may indicate threshold values ptrs-MCSi, i=1, 2, 3, 4 as illustrated in table 500 of FIG. 5. For cyclic prefix OFDM (CP-OFDM), TimeDensity, parameter L, may include every symbol, every second symbol, or every fourth symbol, and more specifically, TimeDensity, parameter L, may be equal to one, two, or four. When L equals one, PTRS tones are sent on every physical downlink shared channel (PDSCH) symbol. When L equals two, PTRS tones are sent on one symbol for every two PDSCH symbols. When L equals four, PTRS tones are sent on one symbol for every four PDSCH symbols. As the scheduled MCS increases, the time density of the PTRS is expected to increase, as well.

FIG. 6 illustrates an example table of frequency density parameters for PTRSs, in accordance with certain aspects of the present disclosure. As shown in Table 600 of FIG. 6, the frequency density of PTRS may be determined as a function of scheduled bandwidth (e.g., in number of RBs). In particular, frequencyDensity, parameter K, may indicate scheduled bandwidth threshold values NRB,i, i=0, 1 as illustrated in Table 600 of FIG. 6. For CP-OFDM, FrequencyDensity, parameter K, may include may include occupying at least one subcarrier in every second RB or every fourth RB, and more specifically, FrequencyDensity, parameter K, may be equal to two or four. When K equals two, PTRS tones are sent every 2 RBs. When K equals four, PTRS tones are sent every 4 RBs. In other words, the frequency density may include occupying at least one subcarrier in every RB, every second RB, or every fourth RB. The subcarrier may not necessarily be in all REs; however, this is dependent upon the corresponding time density. As the scheduled bandwidth increases, the time density of the PTRS is expected to decrease.

FIGS. 7A and 7B illustrate example tables of subcarrier offsets for UL PTRS and DL PTRS, respectively, in accordance with certain aspects of the present disclosure. PTRS allocation in the frequency domain is determined by an offset parameter, $k_{ref}$, which indicates the subcarrier offset for UL PTRS. Offset parameter, $k_{ref}$, depends on a demodulation resource signal (DMRS) port associated with a PTRS port, as illustrated in Table 700A of FIG. 7A. Further, if the higher-layer parameter, resourceElementOffset, in the PTRS-UplinkConfig, is not configured, value 00 is applied to determine $k_{ref}$ (i.e., the column corresponding to resourceElementOffset00 shall be used in determining $k_{ref}$).

Similarly for DL PTRS, PTRS allocation in the frequency domain is also determined by an offset parameter, $k_{ref}$, which indicates the subcarrier offset for DL PTRS. Offset parameter, $k_{ref}$, depends on a demodulation resource signal (DMRS) port associated with a PTRS port, as illustrated in Table 700B of FIG. 7B. Further, if the higher-layer parameter resourceElementOffset, in the PTRS-DownlinkConfig, is not configured, value 00 is applied to determine $k_{ref}$ (i.e., the column corresponding to resourceElementOffset00 shall be used in determining $k_{ref}$).

For example, offset parameter, $k_{ref}$, may be determined using Table 700B in FIG. 7B, for the example PTRS tones in a RB, illustrated in FIG. 4. If the PTRS tone has a higher-layer parameter, resourceElementOffset, in the PTRS-DownlinkConfig for DMRS Configuration type 1, configured to be offset01 and is associated with a DMRS antenna port, then the offset parameter, $k_{ref}$, may be determined to be three.

ICI is an impairment well known to degrade performance of OFDM transmissions. ICI arises from carrier frequency offsets (CFOs), from the Doppler spread due to channel time-variation and, to a lesser extent, from sampling frequency offsets (SFOs). Generally, the presence of PN in an OFDM system introduces ICI at the subcarrier level of the received signal. The strength of the ICI is a function of the received signal strength and the PN variance. Further, based on the phase noise, an ICI compensation scheme, direct de-ICI filter may be constructed for use in filtering received PTRS tones before demodulation. PTRS design may support estimating the de-ICI filter.

For example, PTRSs are transmitted on sub-carriers $k_0$, $k_0+1, \ldots, k_0+M-1$ (i.e., for a block of M contiguous PTRS tones, the values on $S_k$ at these sub-carriers are known). First, the de-ICI filter can be obtained, then the de-ICI filter can be used to filter received tones before demodulation.

A (2u+1)-tap de-ICI filter can be constructed such that:

$$\sum_{m=-u}^{u} a_m R_{k-m} \approx H_k S_k = Xk \text{ for } k \in \{k_0, k_1, \ldots, k_{N-1}\}$$

The (2u+1)-tap de-ICI filter can be obtained from minimizing the following residue sum of squares:

$$\left\| \begin{bmatrix} R_{k_0+u} & R_{k_0+u-1} & \cdots & R_{k_0-u} \\ R_{k_1+u} & R_{k_1+u-1} & \cdots & R_{k_1-u} \\ \vdots & \vdots & \ddots & \vdots \\ R_{k_{N-1}+u} & R_{k_{N-1}+u-1} & \cdots & R_{k_{N-1}-u} \end{bmatrix} \begin{bmatrix} a_{-u} \\ a_{-u+1} \\ \vdots \\ a_u \end{bmatrix} - x \right\|^2 \overset{\Delta}{=} \|R_u a_u - x\|^2$$

For u=1, the (2u+1)-tap de-ICI filter can be obtained from minimizing the following residue sum of squares:

$$\left\| \begin{bmatrix} R_{k_0+1} & R_{k_0} & R_{k_0-1} \\ \vdots & \vdots & \vdots \\ R_{k_{N-1}+1} & R_{k_{N-1}} & R_{k_{N-1}-1} \end{bmatrix} \begin{bmatrix} a_{-1} \\ a_0 \\ a_1 \end{bmatrix} - x \right\|^2 \overset{\Delta}{=} \|R_1 a - x\|^2$$

The least squares problem has a solution given by $$\hat{a}_u = (R_u^H R_u)^{-1} R_u^H x$$

The $\hat{a}_u$ is used to filter the received tones before the OFDM demodulator.

It is essential that the PTRS pattern capture the ICI impact. Unlike the current NR configurations for PTRS, clustered PTRSs have contiguous sets of PTRS tones in the frequency domain which may be better suited for capturing the ICI impact.

Figure 8:
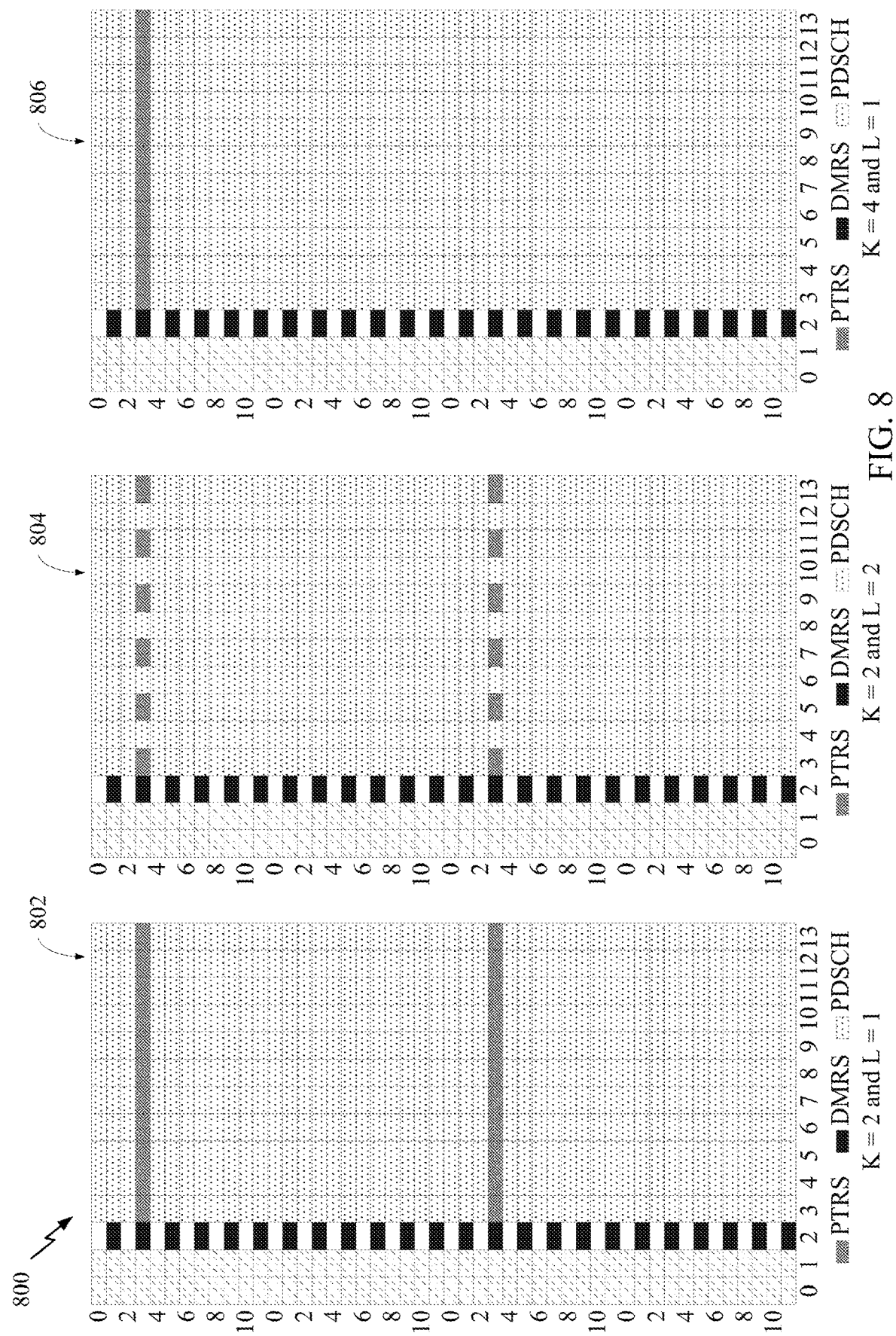
FIG. 8 illustrates example PTRS tone patterns in a resource block, in accordance with certain aspects of the present disclosure.

FIG. 8 illustrates example (isolated) PTRS patterns in the frequency domain, in accordance with current NR configurations for PTRS, in accordance with certain aspects of the present disclosure. The PTRS tones may be sent according to parameters, such as timeDensity ($L_{PT-RS}$) and frequencyDensity (1/n), which may be specified by parameters L and K, respectively.

As mentioned, TimeDensity, parameter L, may be equal to one, two, or four. Further, FrequencyDensity, parameter K, may be equal to two or four.

For example, as shown in example PTRS pattern 802, with a frequencyDensity, K, of 2 and a timeDensity, L, of 1, one PTRS tone is sent every two RBs and PTRS tones are sent on every PDSCH, respectively. Further, in the example PTRS pattern 804, with a frequencyDensity, K, of 2 and a timeDensity, L, of 2, one PTRS tone is sent every two RBs and PTRS tones are sent on one symbol for every two PDSCH symbols, respectively. Further, in example PTRS pattern 806, with a frequencyDensity, K, of 4 and a timeDensity, L, of 1, one PTRS tone is sent every four RBs and PTRS tones are sent on every PDSCH, respectively.

When the PTRS tones are uniformly distributed over the frequency domain, the PTRSs have a good frequency diversity.

Figure 9:
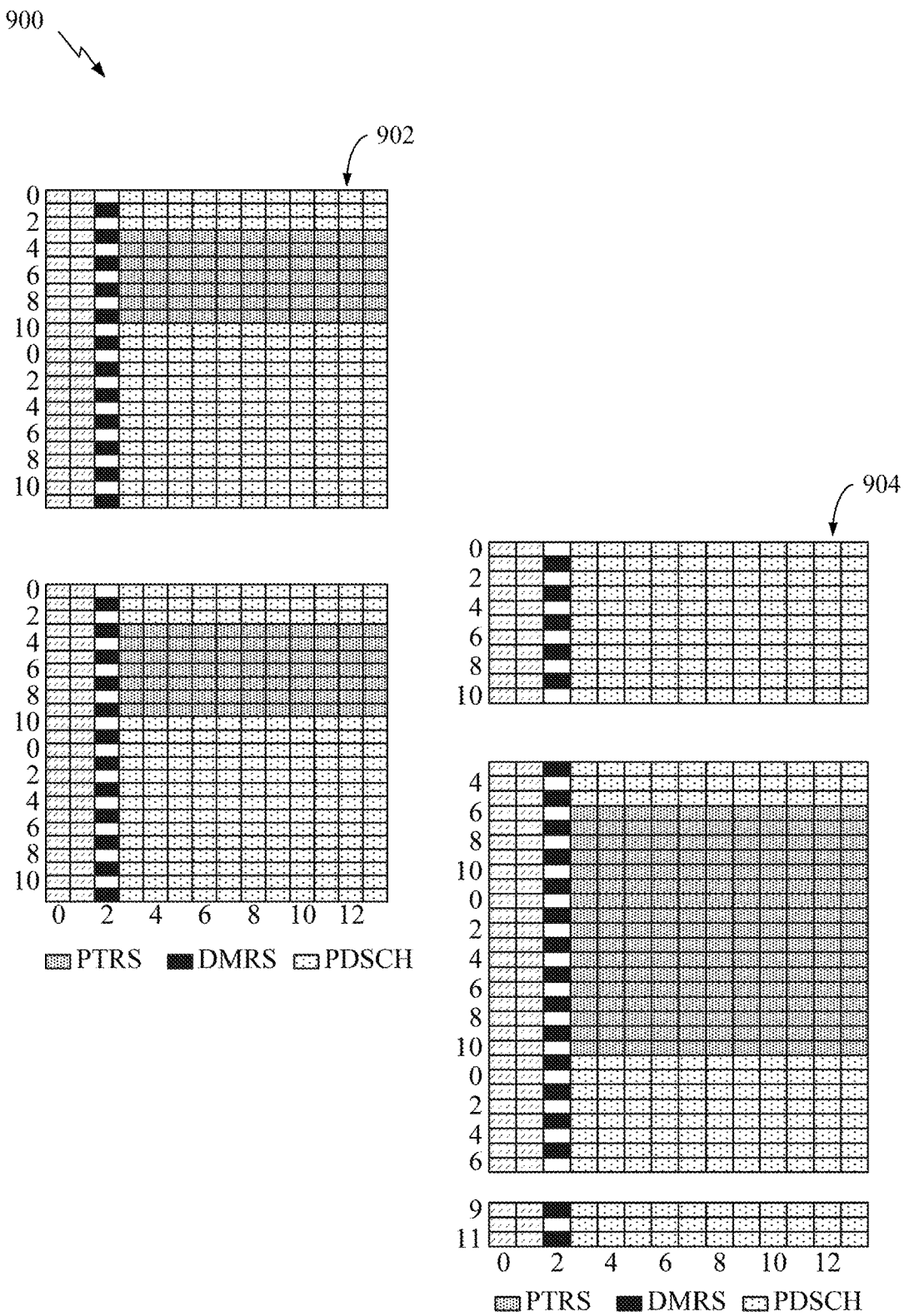
FIG. 9 illustrates example clustered PTRS patterns, in accordance with certain aspects of the present disclosure.

FIG. 9 illustrates example subcarriers in an RB containing clustered PTRS patterns in the frequency domain, in accordance with certain aspects of the present disclosure. In an RB, there may be a single PTRS cluster or several PTRS clusters, each having a number of contiguous PTRS tones. For example, as shown at 902, multiple clusters may be present, whereas, as shown at 904, only a single cluster may be present.

Although clustered PTRS patterns may better capture ICI impact, clustered PTRSs may be subject to undesirable, frequency selective fading.

Generally, the presence of PN in an OFDM system introduces ICI at the subcarrier level of the received signal. The strength of the ICI is a function of the received signal strength and the PN variance. Currently, there are several schemes to compensate the PN effect, and each scheme benefits from having a particular PTRS pattern. For example, some CPE compensation schemes require and benefit from having a PTRS pattern which aligns the PTRS tones with the DMRS tones. This pattern allows for a phase difference to be calculated and utilized to compensate the PN effect. In other examples, such as in ICI compensation schemes, a block PTRS pattern is desired, as illustrated in FIG. 9.

As mentioned above, clustered PTRSs have contiguous sets of PTRS tones in the frequency domain which may be better suited for use in an ICI filter approximation because this pattern captures the ICI impact better. Because ICI compensation schemes are concentrated upon having a PTRS pattern with a contiguous set of PTRS tones, in some cases the PTRS may not be aligned with the DRMS tones. For this reason, the pattern desired for ICI compensation may be difficult to use in CPE compensation schemes.

Aspects of the present disclosure provide improved techniques and apparatuses for changing the PTRS pattern from one symbol to another to allow for different combinations of PN compensations schemes. Further, aspects of the present disclosure provide improved techniques and apparatuses for offsetting allocation of PTRS tones to efficiently determine an ICI compensation.

Example Phase Tracking Reference Signal (PTRS) Pattern Changing Over Different Symbols As mentioned above, aspects of the present disclosure relate generally to improved techniques for efficiently using phase tracking reference signals (PTRSs). In some systems, a user equipment (UE) or network entity (e.g., base station (BS), such as a gNB)) may identify different patterns of PTRS tones to monitor for different symbols and determine when to change patterns from one symbol to another. In some aspects, the UE and/or network entity may estimate filter coefficients for a direct de-intercarrier interference (de-ICI) filter utilizing the identified PTRS patterns over the different symbols, where each identified PTRS pattern has offset PTRS tones to establish a certain number of tones on top of a first PTRS tone in the PTRS.

For example, to estimate filter coefficients using the aforementioned direct de-ICI filter implementation while maintaining full utilization of PTRS tones for ICI compensation and a filter length of 2u+1, a number u PDSCH tones are needed on top of a first PTRS tone in the PTRS. With current new radio (NR) configurations, PTRS allocation in the frequency domain for a first PTRS tone may limit the filter length to ensure utilization of the first PTRS. The filter length may be limited based on an offset value. Alternatively, the UE or network entity may determine to discard the first PTRS tone from the filter coefficient calculation altogether.

Additionally, to estimate filter coefficients using the aforementioned direct de-ICI filter implementation, a sufficient number of equations are needed to efficiently estimate the filter coefficients. With current NR configurations, a number of PTRS tones received by the UE or network entity depends upon allocation in the resource block (RB). In some instances, the RB allocation may lead to an insufficient number of equations needed to efficiently estimate filter coefficients for the de-ICI filter.

Figure 10:
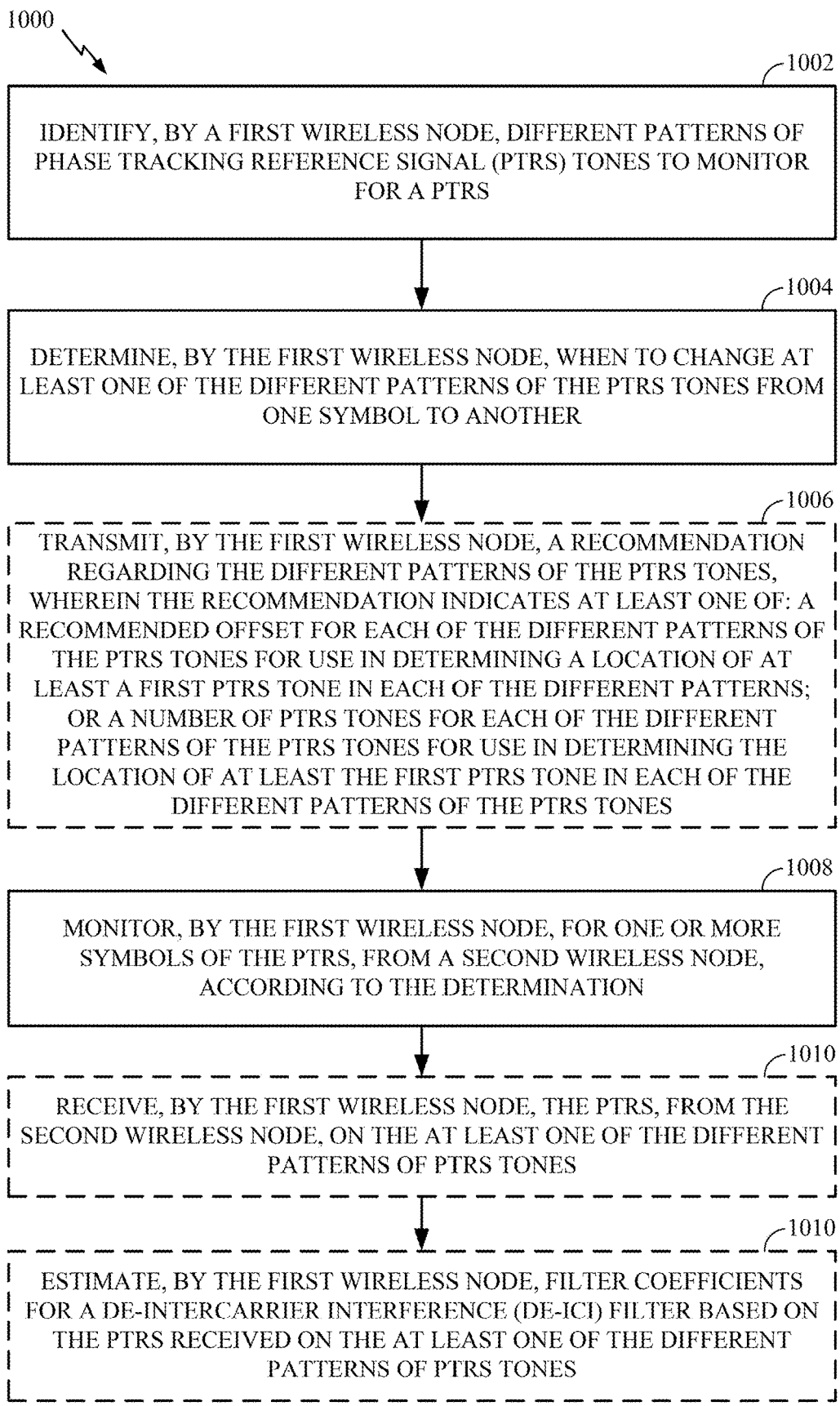
FIG. 10 is a flow diagram illustrating example operations for wireless communication by a first wireless node for receiving a PTRS, in accordance with certain aspects of the present disclosure.

FIG. 10 is a flow diagram illustrating example operations 1000 for wireless communication by a first wireless node for receiving a PTRS, in accordance with certain aspects of the present disclosure. Operations 1000 may be performed, for example, by a UE (e.g., such as UE 120a in wireless communication network 100) to receive downlink (DL) PTRS or by a network entity (e.g., such as BS 110a in wireless communication network 100) to receive uplink (UL) PTRS.

Operations 1000 may be implemented as software components that are executed and run on one or more processors (e.g., controller/processor 280 or controller/processor 240 of FIG. 2). Further, the transmission and reception of signals by the first wireless node in operations 1000 may be enabled, for example, by one or more antennas (e.g., antennas 252 or antennas 234 of FIG. 2). In certain aspects, the transmission and/or reception of signals by the first wireless node may be implemented via a bus interface of one or more processors (e.g., controller/processor 280 or controller/processor 240) for obtaining and/or outputting signals.

Operations 1000 begin, at block 1002, by the first wireless node, identifying different patterns of PTRS tones to monitor for a PTRS.

At block 1004, the first wireless node determines when to change at least one of the different patterns of the PTRS tones from one symbol to another.

Optionally at block 1006, the first wireless node transmits a recommendation regarding the different patterns of the PTRS tones. In some cases, the recommendation indicates at least one of: a recommended offset for each of the different patterns of the PTRS tones for use in determining a location of at least a first PTRS tone in each of the different patterns or a number of PTRS tones for each of the different patterns of the PTRS tones for use in determining the location of at least the first PTRS tone in each of the different patterns of the PTRS tones.

At block 1008, the first wireless node monitors for one or more symbols of the PTRS, from a second wireless node, according to the determination.

Optionally at block 1010, the first wireless node receives the PTRS, from the second wireless node, on the at least one of the different patterns of PTRS tones, and at block 1012, estimates filer coefficients for a de-ICI filter based on the PTRS received on the at least one of the different patterns of PTRS tones.

Figure 11:
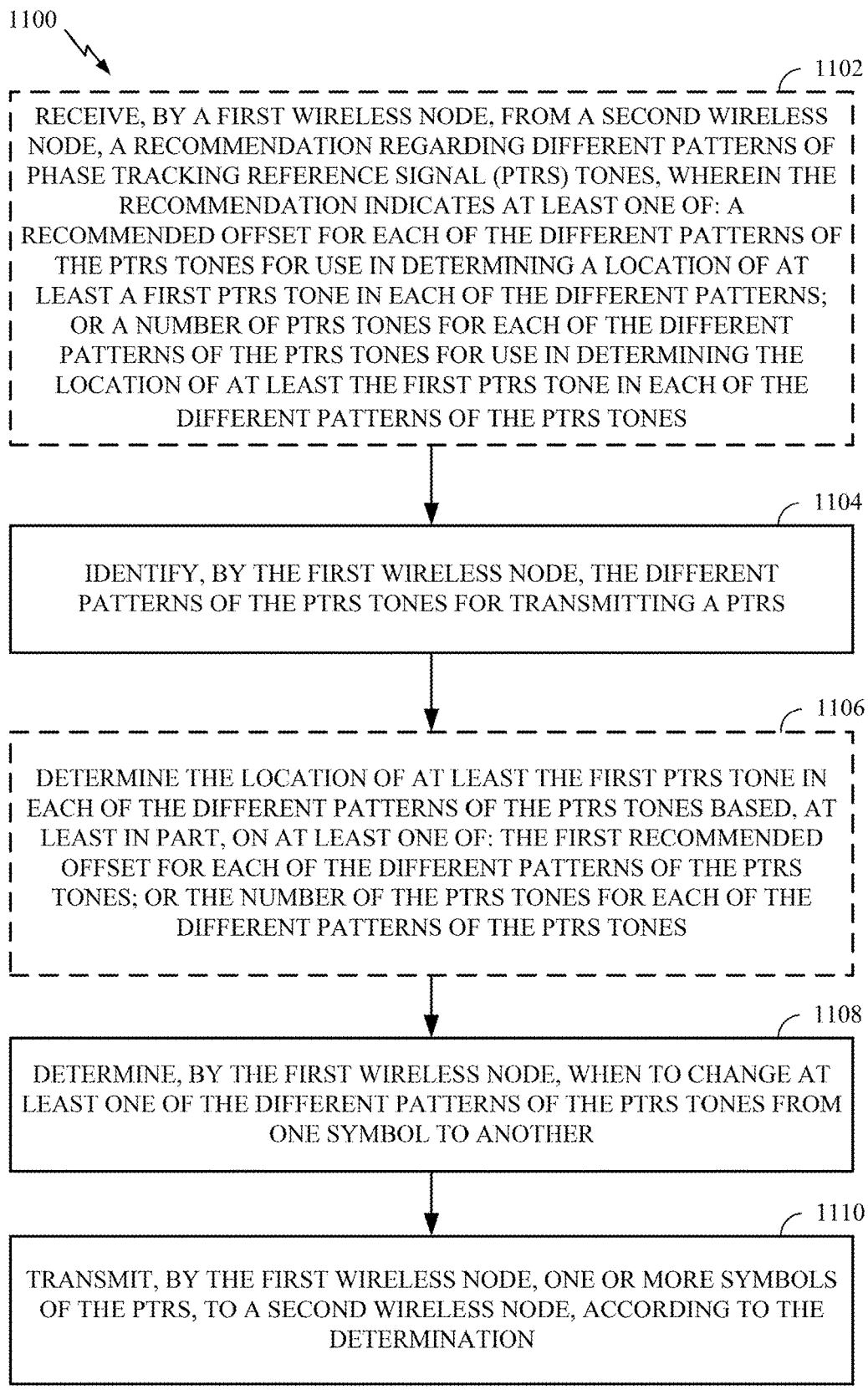
FIG. 11 is a flow diagram illustrating example operations for wireless communication by a first wireless node for transmitting a PTRS, in accordance with certain aspects of the present disclosure.

FIG. 11 is a flow diagram illustrating example operations 1100 for wireless communication by a first wireless node for transmitting a PTRS, in accordance with certain aspects of the present disclosure. Operations 1100 may be considered complementary to operations 1000 of FIG. 10. For example, operations 1100 may be performed by a UE (e.g., such as UE 120a in wireless communication network 100) to transmit UL PTRS network entity (e.g., such as the BS 110a in the wireless communication network 100) to transmit DL PTRS to be received by a wireless node performing operations 1000 of FIG. 10.

Operations 1100 may be implemented as software components that are executed and run on one or more processors (e.g., controller/processor 240 or controller/processor 280 of FIG. 2). Further, the transmission and reception of signals by the first wireless node in operations 1100 may be enabled, for example, by one or more antennas (e.g., antennas 234 or antennas 252 of FIG. 2). In certain aspects, the transmission and/or reception of signals by the first wireless node may be implemented via a bus interface of one or more processors (e.g., controller/processor 240 or controller/processor 280) for obtaining and/or outputting signals.

Operations 1100 begin, at block 1104, by the first wireless node identifies different patterns of PTRS tones for transmitting a PTRS.

Optionally, prior to block 1004, at block 1002, the first wireless node receives, from the second wireless node, a recommendation regarding the different patterns of the PTRS tones. Thus, at block 1104, the first wireless node identifies the different patterns of the PTRS tones based, at least in part, on the recommendation. In some cases, the recommendation indicates at least one of: a first recommended offset for each of the different patterns of the PTRS tones for use in determining a location of at least a first PTRS tone in each of the different patterns of the PTRS tones or a number of PTRS tones for each of the different patterns of the PTRS tones for use in determining the location of at least the first PTRS tone in each of the different patterns of the PTRS tones.

Where at block 1002, the recommendation indicates at least one of a recommended offset or a number of PTRS tones for each of the different patterns of the PTRS tones, optionally at block 1106, determines the location of at least the first PTRS tone in each of the different patterns of the PTRS tones based, at least in part, on at least one of: the first recommended offset for each of the different patterns of the PTRS tones; or the number of the PTRS tones for each of the different patterns of the PTRS tones.

At block 1108, the first wireless node determines when to change at least one of the different patterns of the PTRS tones from one symbol to another.

At block 1110, the first wireless node transmits one or more symbols of the PTRS, to a second wireless node, according to the determination. In some cases, the first wireless node transmits the PTRS on at least the first PTRS tone in each of the different patterns of the PTRS tones according to the determination of when to change the at least one of the different patterns of the PTRS tones.

Figure 12:
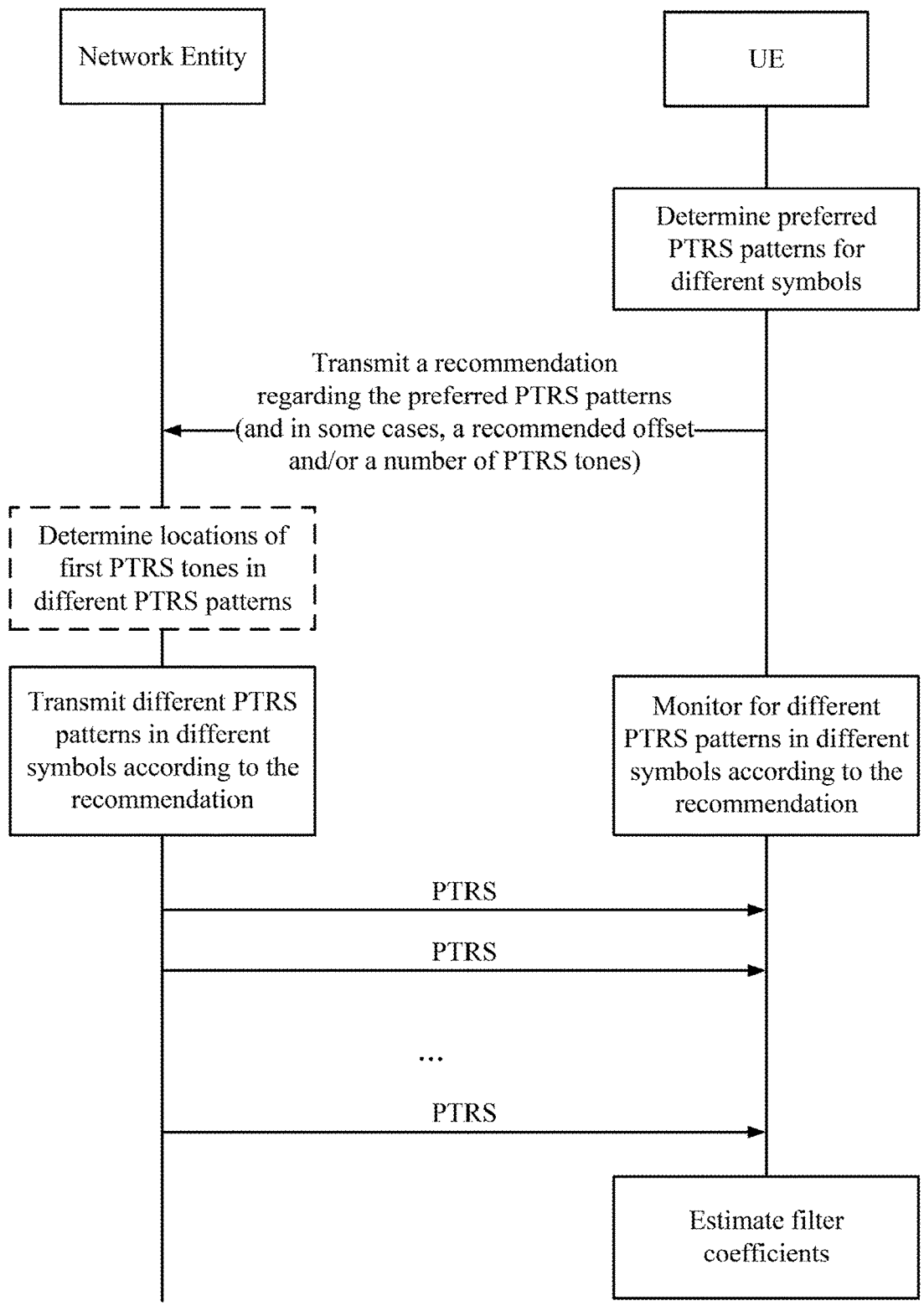
FIG. 12 is a call flow diagram illustrating a non-limiting example which supports changing PTRS patterns over different symbols for DL PTRS transmissions, in accordance with certain aspects of the present disclosure.
Figure 13:
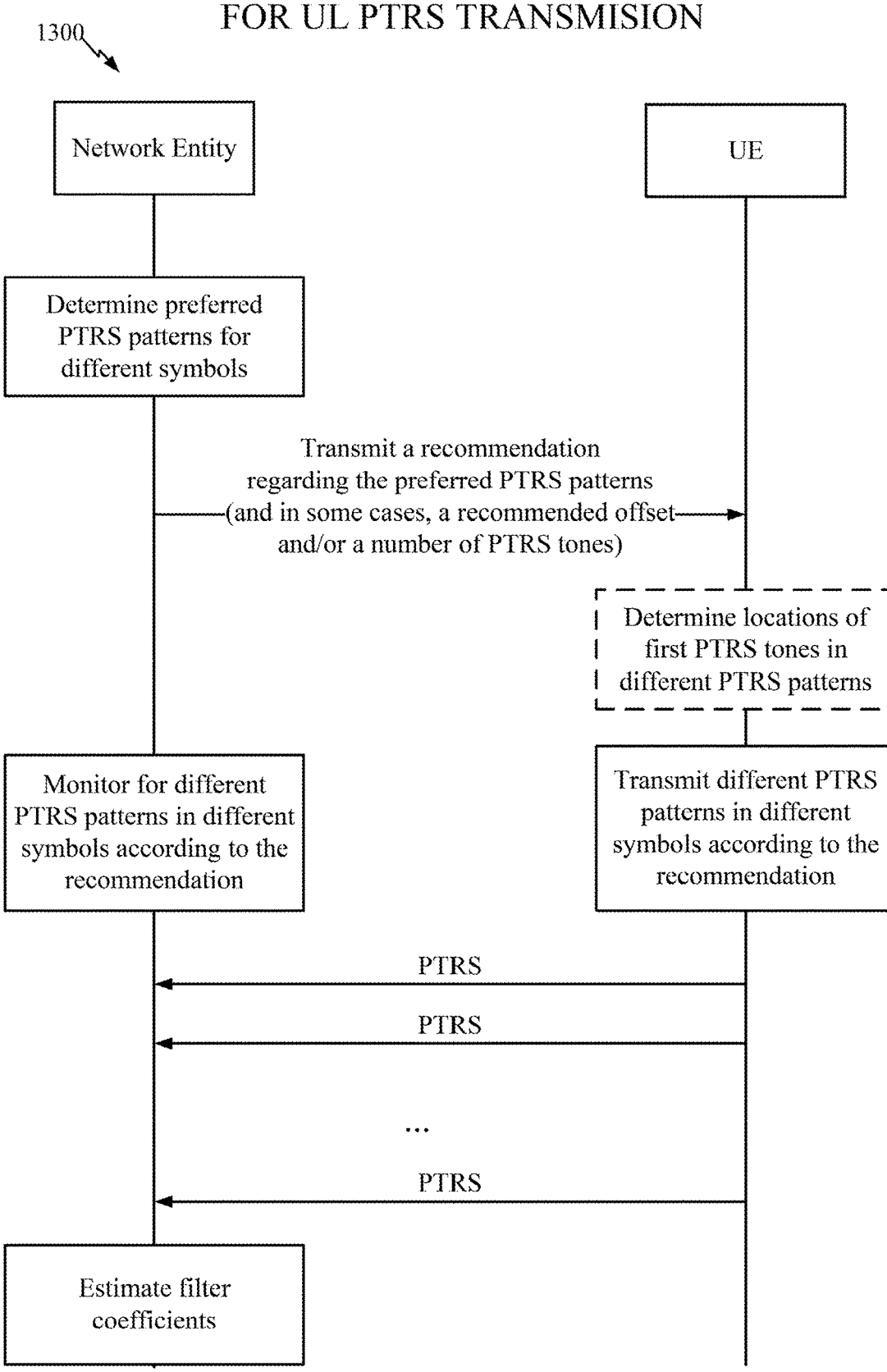
FIG. 13 is a call flow diagram illustrating a non-limiting example which supports changing PTRS patterns over different symbols for UL PTRS transmissions, in accordance with certain aspects of the present disclosure.

Operations 1000 and 1100 of FIGS. 10 and 11 may be understood with reference to call flow diagrams 1200 and 1300 of FIGS. 12 and 13, respectively, that show examples of a UE sending (in FIG. 12) or receiving (in FIG. 13) a recommendation of different PTRS patterns to be used in UL and DL transmission, respectively, in accordance with aspects of the present disclosure.

As shown in the non-limiting example of FIG. 12, a UE may begin by determining preferred PTRS patterns of PTRS tones for different symbols. For example, preferred PTRS patterns may be chosen based on a type of PN compensation algorithm used by the UE. Subsequently, the UE may transmit to a network entity a recommendation regarding the preferred PTRS patterns.

In some cases, the recommendation may also indicate at least one of a recommended offset or a number of PTRS tones for each of the different patterns of the PTRS tones.

Thus, in cases where the recommendation indicates a recommended offset for each of the different patterns of the PTRS tones recommended by the UE, the network entity may determine the location of at least a first PTRS tone in each of the different patterns of the PTRS tones based, at least in part, on the first recommended offset for each of the different patterns of the PTRS tones. In cases where the recommendation indicates a number of PTRS tones for each of the different patterns of the PTRS tones recommended by the UE, the network entity may determine the location of at least a first PTRS tone in each of the different patterns of the PTRS tones based, at least in part, on the number of the PTRS tones for each of the different patterns of the PTRS tones.

The network entity may then identify different patterns of PTRS tones to transmit a PTRS to the UE. The UE may monitor for the PTRS, from the network entity, according to its recommendation regarding the preferred PTRS patterns (an in some cases, the recommended offset and/or the recommended number of PTRS tones).

Based on measurement of the PTRS on the PTRS tones, the UE may estimate filter coefficients for the de-ICI filter.

While the description of FIG. 12 refers to an example of recommending PTRS patterns for UL PTRS transmission (e.g., PTRS transmission from a UE to a network entity), PTRS patterns may also be recommended for DL PTRS transmission (e.g., PTRS transmission from a network entity to a UE), as shown in FIG. 13.

As shown in the non-limiting example of FIG. 13, a network entity may begin by determining preferred PTRS patterns of PTRS tones for different symbols. Subsequently, the network entity may transmit to a UE a recommendation regarding the preferred PTRS patterns.

In some cases, the recommendation may also indicate at least one of a recommended offset or a number of PTRS tones for each of the different patterns of the PTRS tones recommended by the network entity. Thus, in cases where the recommendation indicates a recommended offset for each of the different patterns of the PTRS tones recommended by the network entity, the UE may determine the location of at least a first PTRS tone in each of the different patterns of the PTRS tones based, at least in part, on the first recommended offset for each of the different patterns of the PTRS tones. In cases where the recommendation indicates a number of PTRS tones for each of the different patterns of the PTRS tones recommended by the network entity, the UE may determine the location of at least a first PTRS tone in each of the different patterns of the PTRS tones based, at least in part, on the number of the PTRS tones for each of the different patterns of the PTRS tones.

The UE may then identify different patterns of PTRS tones to transmit a PTRS to the network entity. The network entity may monitor for the PTRS, from the UE, according to its recommendation regarding the preferred PTRS patterns (an in some cases, the recommended offset and/or the recommended number of PTRS tones).

Based on measurement of the PTRS on the PTRS tones, the network entity may estimate filter coefficients for the de-ICI filter.

Some symbols may have a block PTRS pattern (e.g., PTRS pattern with a contiguous set of PTRS tones as shown in FIG. 9) or a legacy PTRS pattern (e.g., PTRS pattern with a discontiguous set of PTRS tones as shown in FIG. 8) with different tone distributions. In some examples, a wireless node may identify a PTRS pattern to monitor which has some PTRS tones in the pattern aligned with one or more demodulation reference signal (DMRS) port tones (i.e., generally seen with PTRS tones that follow a legacy PTRS pattern).

Further to identifying PTRS patterns, the wireless node may also determine when to change such example PTRS patterns from one symbol to another. Thus, in some examples, the wireless node may transmit different PTRS patterns in different symbols. In some examples, determining when to change the PTRS pattern across different symbols may be predefined (e.g., hard coded per a standard specification). In some examples, determining when to change the PTRS pattern across different symbols may be configured via network signaling (for example, the network signaling may be radio resource control (RRC) signaling).

As mentioned above, in some examples, the wireless node may identify a legacy PTRS pattern. PTRS tones which follow a legacy pattern are aligned with one or more DMRS port tones. To ensure alignment, the offset for a first PTRS tone may vary from one symbol to another. For a given symbol, the offset (in frequency) may be based on either a deterministic shift from one symbol to another or may be configured via network signaling for each symbol (e.g., via RRC signaling). In examples utilizing an offset based upon a deterministic shift, only a first offset may be determined which may be further applied on the other symbols.

As mentioned, in some cases, the offset for the first PTRS for each of the different patterns of the PTRS tones may be included in the recommendation regarding the preferred PTRS patterns. Thus, the offset for the first PTRS tone in each of the different patterns may be determined based, at least in part, on the recommendation.

In some examples, the recommendation regarding the preferred PTRS patterns may explicitly indicate PTRS patterns by indicating a specific mixture of different PTRS patterns. In some examples, the recommendation regarding the preferred PTRS patterns may implicitly indicate PTRS patterns by indicating different types of PN compensation algorithms which correspond to and indicate different PTRS patterns. For example, a CPE compensation scheme may correspond to a legacy PTRS pattern while an ICI compensation scheme may correspond to a block PTRS pattern.

In some examples, a wireless node may identify the different patterns based, at least in part, on a recommendation regarding different PTRS patterns received from another wireless node (e.g., a UE for UL PTRS transmission and a network entity for DL PTRS transmission). As mentioned above, some symbols may have a block PTRS pattern (e.g., PTRS pattern with a contiguous set of PTRS tones), a legacy PTRS pattern (e.g., PTRS pattern with a discontiguous set of PTRS tones). Generally in the legacy PTRS pattern, some PTRS tones may be aligned with one or more DMRS port tones.

While several schemes used to compensate the PN benefit from having a particular PTRS pattern, including CPE and ICI compensation schemes, many ICI compensation schemes also require knowledge of the channel estimates. Knowledge of the channel estimates is essential because these channel estimates may also be corrupted with the PN (e.g., the DMRS tones suffer from ICI). Thus, beyond recommending PTRS patterns for DL transmission, in some examples, the wireless node (e.g., a UE for UL PTRS transmission and a network entity for DL PTRS transmission) may also transmit a recommendation regarding a DMRS configuration. In some examples, the recommendation may recommend using larger subcarrier spacing (SCS) for DMRS. In some examples, the recommendation may indicate whether or not frequency division multiplexing (FDM) between DMRS ports is recommended (e.g., recommendation whether to leave the other comb empty or not).

Example Phase Tracking Reference Signal (PTRS) Recommendations for Inter-Carrier Interference (ICI Compensation As mentioned above, to estimate filter coefficients using the aforementioned direct de-intercarrier interference (de-ICI) filter implementation, a sufficient number of equations are needed to efficiently estimate the filter coefficients. With current NR configurations, a number of PTRS tones received by a wireless node, such as a user equipment (UE) or a base station (BS) (e.g., gNB), depends upon allocation in a resource block (RB). In some instances, the RB allocation may lead to an insufficient number of equations needed to efficiently estimate filter coefficients for the de-ICI filter.

Accordingly, aspects described herein utilize a PTRS with offset PTRS tones to establish a certain number of physical downlink shared channel (PDSCH) tones on top of a first PTRS tone in the PTRS to estimate filter coefficients for a direct de-ICI filter.

Although FIGS. 10-13 illustrate techniques for indicating an offset or a number of PTRS tones for use in determining the location of at least the first PTRS tone as part of a recommendation regarding different patterns of the PTRS tones, in some cases, in FIGS. 14-21 a wireless node may indicate an offset or a number of PTRS tones for use in determining the location of at least the first PTRS tone without also recommending different PTRS patterns.

Figure 14:
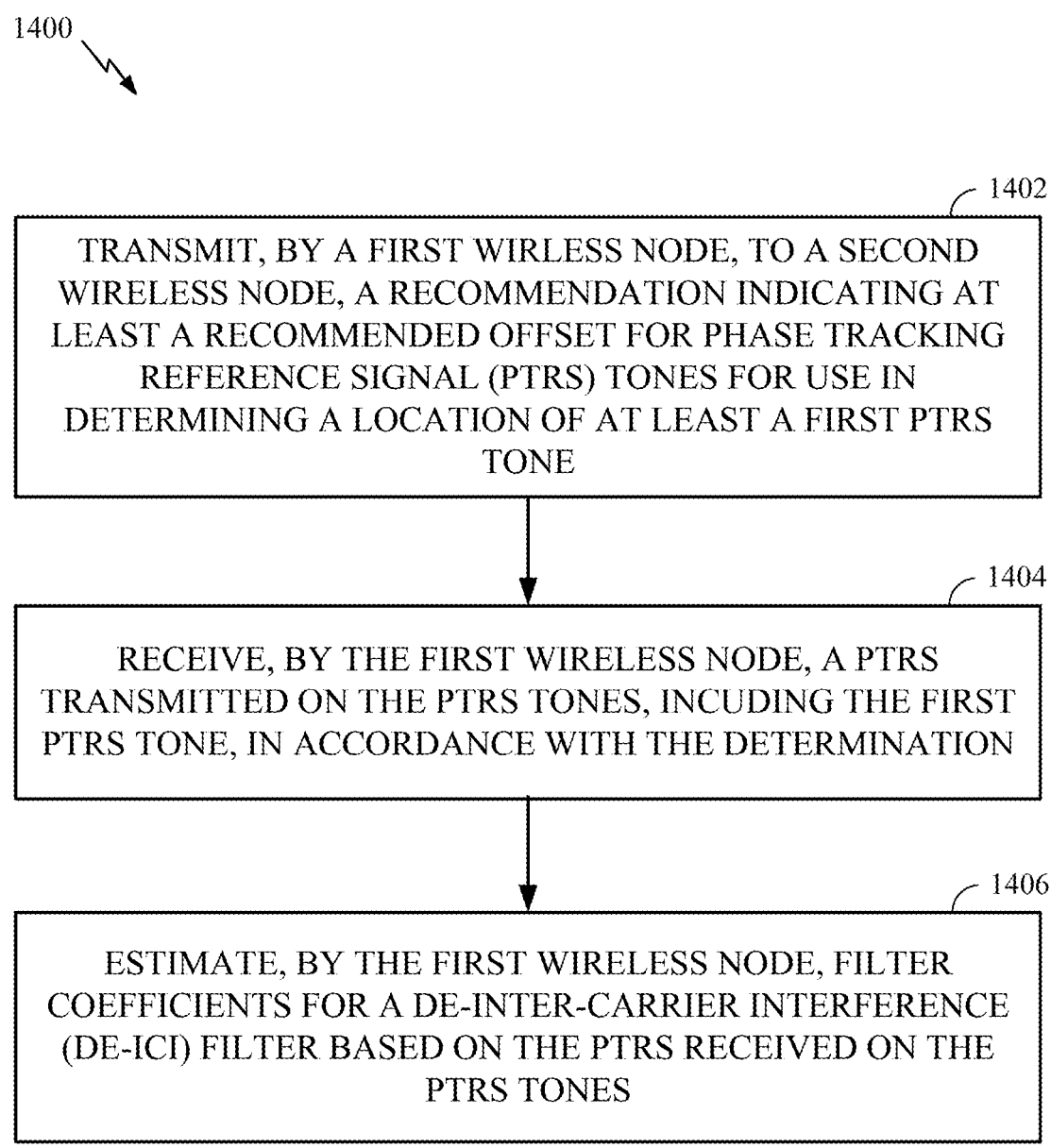
FIG. 14 is a flow diagram illustrating example operations for wireless communication by a first wireless node for receiving a PTRS, in accordance with certain aspects of the present disclosure.

FIG. 14 is a flow diagram illustrating example operations 1400 by a first wireless node for receiving a PTRS, in accordance with certain aspects of the present disclosure. Operations 1400 may be performed, for example, by a UE (e.g., such as UE 120a in wireless communication network 100) to receive downlink (DL) PTRS or by a network entity (e.g., such as BS 110a in wireless communication network 100) to receive uplink (UL) PTRS.

Operations 1400 may be implemented as software components that are executed and run on one or more processors (e.g., controller/processor 280 or controller/processor 240 of FIG. 2). Further, the transmission and reception of signals by the first wireless node in operations 1400 may be enabled, for example, by one or more antennas (e.g., antennas 252 or antennas 234 of FIG. 2). In certain aspects, the transmission and/or reception of signals by the first wireless node may be implemented via a bus interface of one or more processors (e.g., controller/processor 280 or controller/processor 240) for obtaining and/or outputting signals.

Operations 1400 begin, at block 1402, by the first wireless node transmitting, to a second wireless node, a recommendation indicating at least a recommended offset for PTRS tones for use in determining a location of at least a first PTRS tone.

At block 1404, the first wireless node receives A PTRS transmitted on the PTRS tones, including the first PTRS tone, in accordance with the determination.

At block 1406, the first wireless node estimates filter coefficients for a de-ICI filter based on the PTRS received on the PTRS tones.

Figure 15:
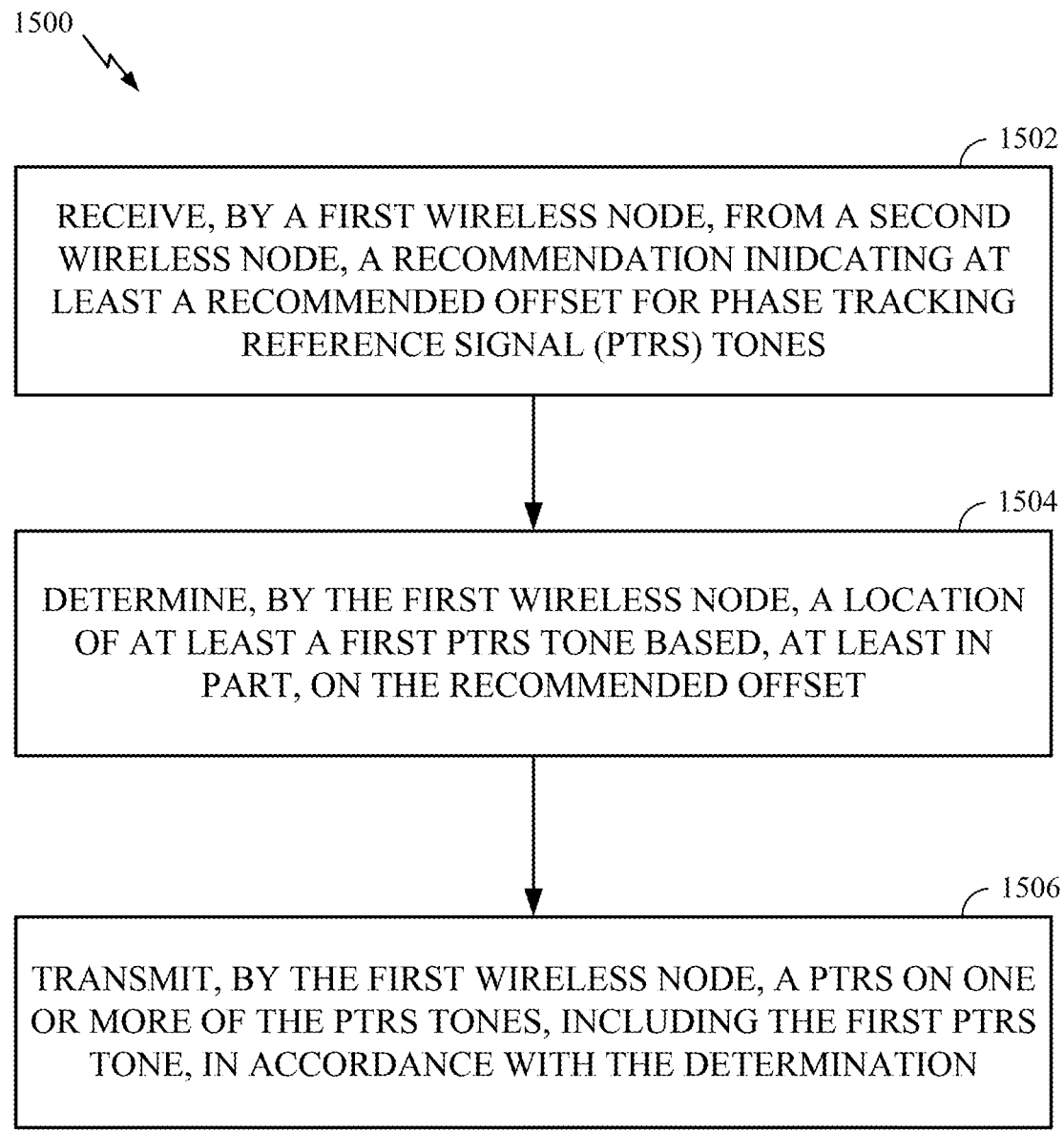
FIG. 15 is a flow diagram illustrating example operations for wireless communication by a first wireless node for transmitting a PTRS, in accordance with certain aspects of the present disclosure.

FIG. 15 is a flow diagram illustrating example operations 1500 for wireless communication by a first wireless node, in accordance with certain aspects of the present disclosure. Operations 1500 may be performed, for example, UE (e.g., such as UE 120a in wireless communication network 100) to transmit UL PTRS or by a network entity (e.g., such as BS 110a in wireless communication network 100) to transmit DL PTRS. Operations 1500 may be considered complementary to operations 1400 of FIG. 14.

Operations 1500 may be implemented as software components that are executed and run on one or more processors (e.g., controller/processor 280 or controller/processor 240 of FIG. 2). Further, the transmission and reception of signals by the first wireless node in operations 1500 may be enabled, for example, by one or more antennas (e.g., antennas 252 or antennas 234 of FIG. 2). In certain aspects, the transmission and/or reception of signals by the first wireless node may be implemented via a bus interface of one or more processors (e.g., controller/processor 280 or controller/processor 240) for obtaining and/or outputting signals.

Operations 1500 begin, at block 1502, by the first wireless node receiving, from a second wireless node, a recommendation indicating at least a recommended offset for PTRS tones.

At block 1504, the first wireless node determines a location of at least a first PTRS tone based, at least in part, on the recommended offset.

At block 1506, the first wireless node transmits a PTRS on one or more of the PTRS tones, including the first PTRS tone, in accordance with the determination.

Figure 16:
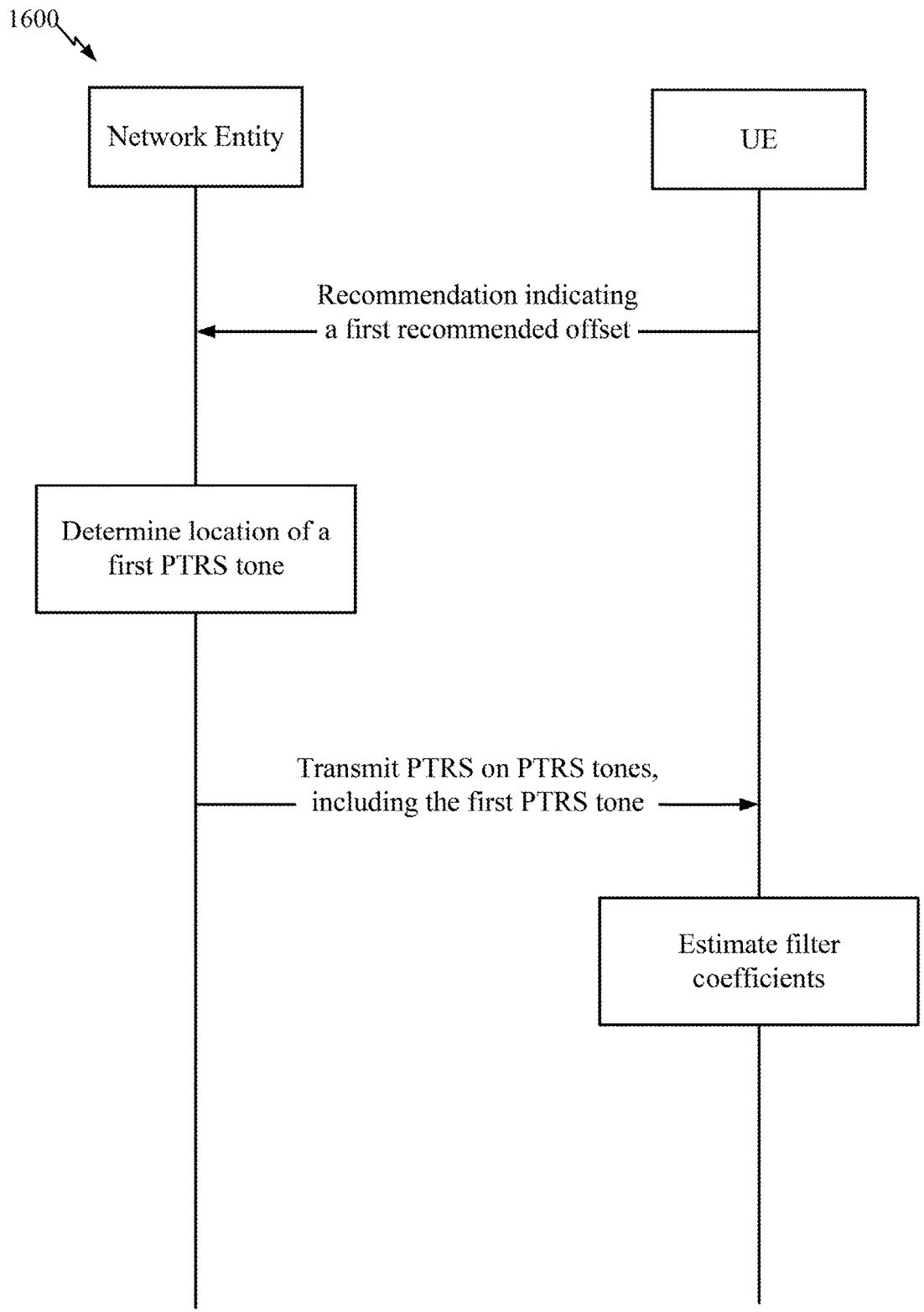
FIG. 16 is a call flow diagram illustrating a non-limiting example which supports using PTRS offset recommendations for inter-carrier interference (ICI) compensation in DL PTRS transmissions, in accordance with certain aspects of the present disclosure.
Figure 17:
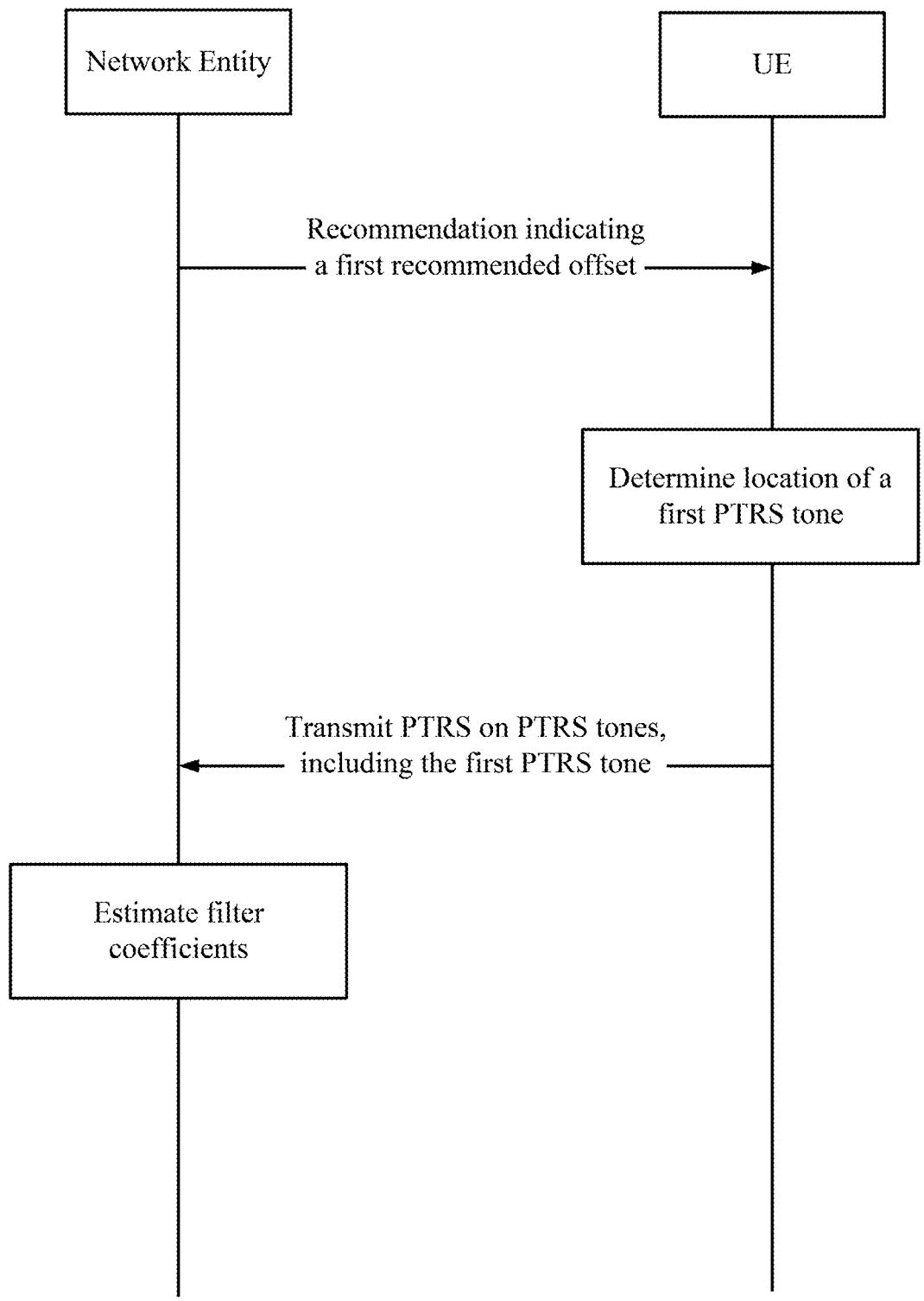
FIG. 17 is a call flow diagram illustrating a non-limiting example which supports using PTRS offset recommendations for ICI compensation in UL PTRS transmissions, in accordance with certain aspects of the present disclosure.

Operations of FIGS. 14 and 15 may be understood with reference to call flow diagrams 1600 and 1700 of FIGS. 16 and 17, respectively. In particular, call flow diagram 1600 of FIG. 16 shows an example of a UE receiving UL PTRS on PTRS tones which include a first PTRS tone in accordance with a location determination, while call flow diagram 1700 of FIG. 17 shows an example of a UE sending UL PTRS on PTRS tone which include a first PTRS tone in accordance with a location determination, in accordance with certain aspects of the present disclosure.

FIG. 16 is a call flow diagram 1600 illustrating a non-limiting example which supports using PTRS offset recommendations for inter-carrier interference (ICI) compensation in DL PTRS transmissions, in accordance with certain aspects of the present disclosure. As shown in FIG. 16, a UE may transmit (and a network entity may receive) a recommendation regarding PTRS tones. For example, the recommendation, from the UE, may include a first recommended offset for PTRS tones of a physical downlink shared channel (PDSCH). In some examples, the recommendation may further indicate a filter length. The recommendation may be transmitted via RRC signaling.

Based on the recommendation, the network entity may determine a location of a first PTRS tone. In some examples, the network entity may determine an association between the first PTRS tone and a DMRS port and use this DMRS port association in conjunction with the first recommended offset to determine the location of the first PTRS tone. In some examples, the location of the first PTRS tone may be aligned with a DMRS tone associated with a DMRS port having a resource element (RE) index greater than or equal to the first recommended offset.

In some cases, the network entity may determine a location of a second PTRS tone based, at least in part, on the first recommended offset or a second recommended offset; however, the location for the second PTRS tone may not be the same location as the first PTRS tone.

Subsequently, the network entity may transmit (and the UE may receive) a PTRS on one or more PTRS tones, including the first PTRS tone, in accordance with the location determination. In some examples, the network entity may transmit PTRS over at least two ports on one or more PTRS tones, including the first PTRS tone over a first port and the second PTRS tone over a second port, in accordance with their respective location determinations.

Based on measurement of the PTRS on the PTRS tones, the UE may estimate filter coefficients for the de-ICI filter.

While the description of FIG. 16 refers to an example of sending a UL PTRS recommendation and a DL PTRS, the process may also be used to send a DL PTRS recommendation and a UL PTRS, as shown in FIG. 17.

FIG. 17 is a call flow diagram 1700 illustrating a non-limiting example which supports using PTRS offset recommendations for ICI compensation in UL PTRS transmissions, in accordance with certain aspects of the present disclosure. As shown in FIG. 17, a network entity (e.g., gNB) may transmit (and a UE may receive) a recommendation regarding PTRS tones. For example, the recommendation, from the network entity, may include a first recommended offset for PTRS tones of the PUSCH. In some examples, the recommendation may further indicate a filter length. The recommendation may be transmitted via RRC signaling.

Based on the recommendation, the UE may determine a location of a first PTRS tone. In some examples, the UE may determine an association between the first PTRS tone and a DMRS port and use this DMRS port association in conjunction with the first recommended offset to determine the location of the first PTRS tone. In some examples, the location of the first PTRS tone may be aligned with a DMRS tone associated with a DMRS port having an RE index greater than or equal to the recommended offset.

In some cases, the UE may determine a location of a second PTRS tone based, at least in part, on the first recommended offset or a second recommended offset; however, the location for the second PTRS tone may not be the same location as the first PTRS tone.

Subsequently, the UE may transmit (and the network entity may receive) PTRS on one or more of the PTRS tones, including the first PTRS tone, in accordance with the location determination. In some examples, the UE may transmit PTRS over at least two ports on one or more PTRS tones, including the first PTRS tone over a first port and the second PTRS tone over a second port, in accordance with their respective location determinations.

Based on measurement of the PTRS on the PTRS tones, the network entity may estimate filter coefficients for the de-ICI filter.

Figure 18:
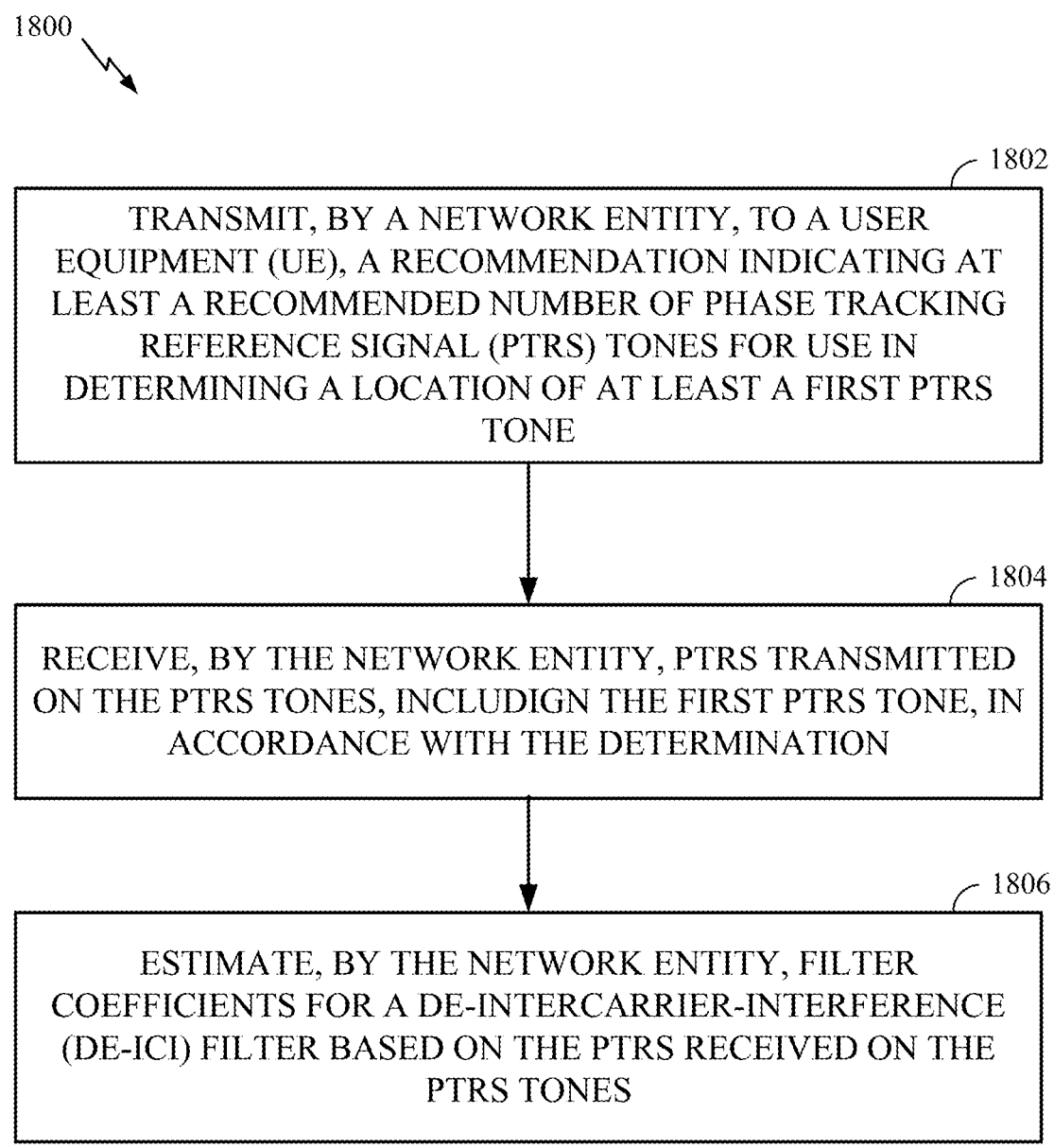
FIG. 18 is a flow diagram illustrating example operations for wireless communication by a first wireless node for receiving a PTRS, in accordance with certain aspects of the present disclosure.

FIG. 18 is a flow diagram illustrating example operations 1800 for wireless communication that may be performed by a first wireless node, in accordance with certain aspects of the present disclosure. Operations 1800 may be performed, for example, by a UE (e.g., such as UE 120a in wireless communication network 100) to receive DL PTRS or by a network entity (e.g., such as BS 110a in wireless communication network 100) to receive UL PTRS.

Operations 1800 may be implemented as software components that are executed and run on one or more processors (e.g., controller/processor 280 or controller/processor 240 of FIG. 2). Further, the transmission and reception of signals by the first wireless node in operations 1800 may be enabled, for example, by one or more antennas (e.g., antennas 252 or antennas 234 of FIG. 2). In certain aspects, the transmission and/or reception of signals by the first wireless node may be implemented via a bus interface of one or more processors (e.g., controller/processor 280 or controller/processor 240) for obtaining and/or outputting signals.

Operations 1800 begin, at block 1802, by the first wireless node transmitting, to a second wireless node, a recommendation indicating at least a recommended number of PTRS tones for use in determining a location of at least a first PTRS tone.

At block 1804, the first wireless node receives a PTRS transmitted on the PTRS tones, including the first PTRS tone, in accordance with the determination.

At block 1806, the first wireless node estimates filter coefficients for a de-ICI filter based on the PTRS received on the PTRS tones.

Figure 19:
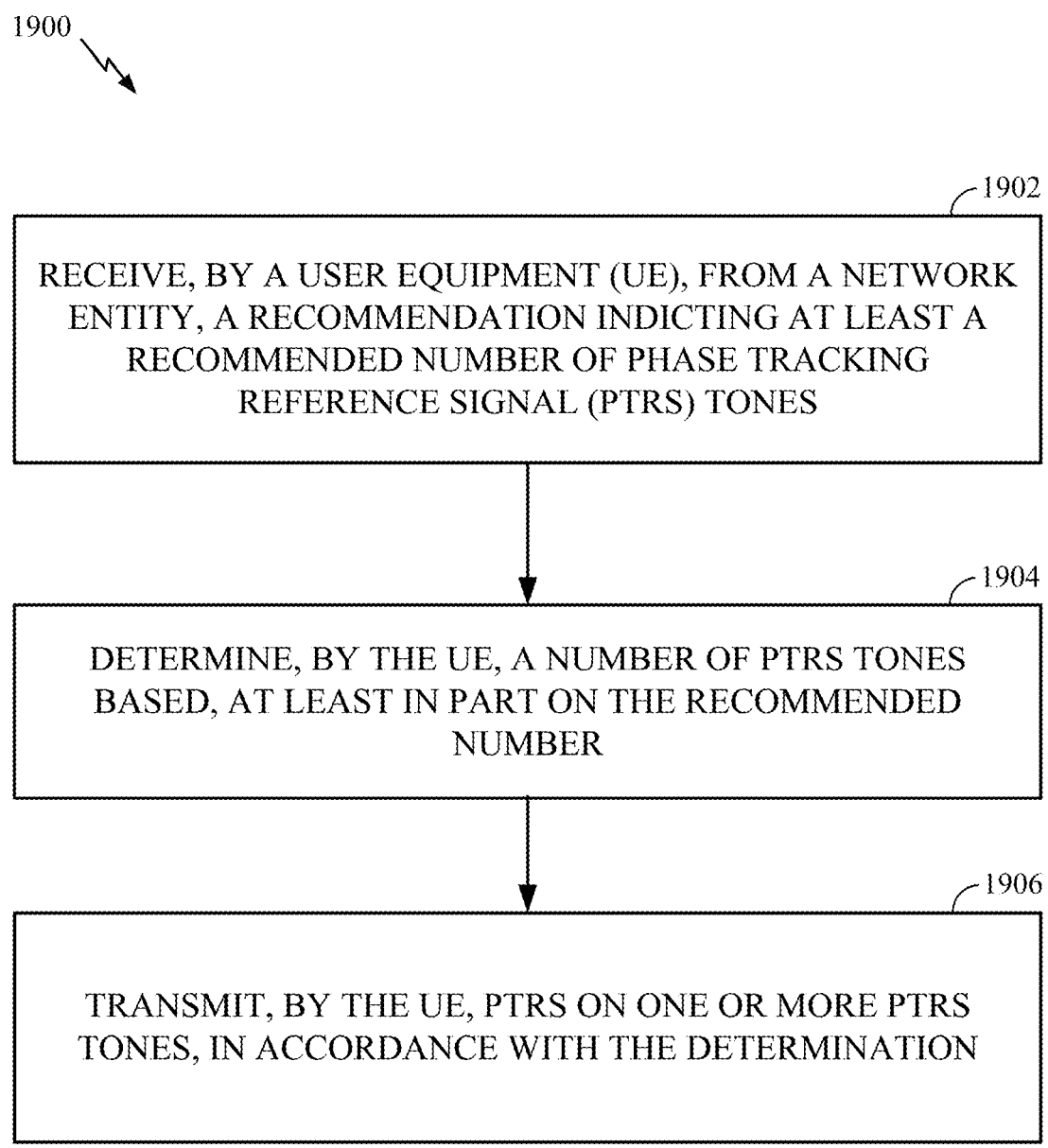
FIG. 19 is a flow diagram illustrating example operations for wireless communication by a first wireless node for transmitting a PTRS, in accordance with certain aspects of the present disclosure.

FIG. 19 is a flow diagram illustrating example operations 1900 for wireless communication by a first wireless node, in accordance with certain aspects of the present disclosure. Operations 1900 may be performed, for example, by a UE (e.g., such as UE 120a in wireless communication network 100) to transmit UL PTRS or by a network entity (e.g., such as BS 110a in wireless communication network 100) to transmit DL PTRS.

Operations 1900 may be implemented as software components that are executed and run on one or more processors (e.g., controller/processor 280 or controller/processor 240 of FIG. 2). Further, the transmission and reception of signals by the first wireless node in operations 1900 may be enabled, for example, by one or more antennas (e.g., antennas 252 or antennas 234 of FIG. 2). In certain aspects, the transmission and/or reception of signals by the first wireless node may be implemented via a bus interface of one or more processors (e.g., controller/processor 280 or controller/processor 240) for obtaining and/or outputting signals.

Operations 1900 begin, at block 1902, by the first wireless node receiving, from a second wireless node, a recommendation indicating at least a recommended number of PTRS tones.

At block 1904, the first wireless node determines a number of PTRS tones based, at least in part, on the recommended number of the PTRS tones.

At block 1906, the first wireless node transmits a PTRS on one or more PTRS tones, in accordance with the determination.

Figure 21:
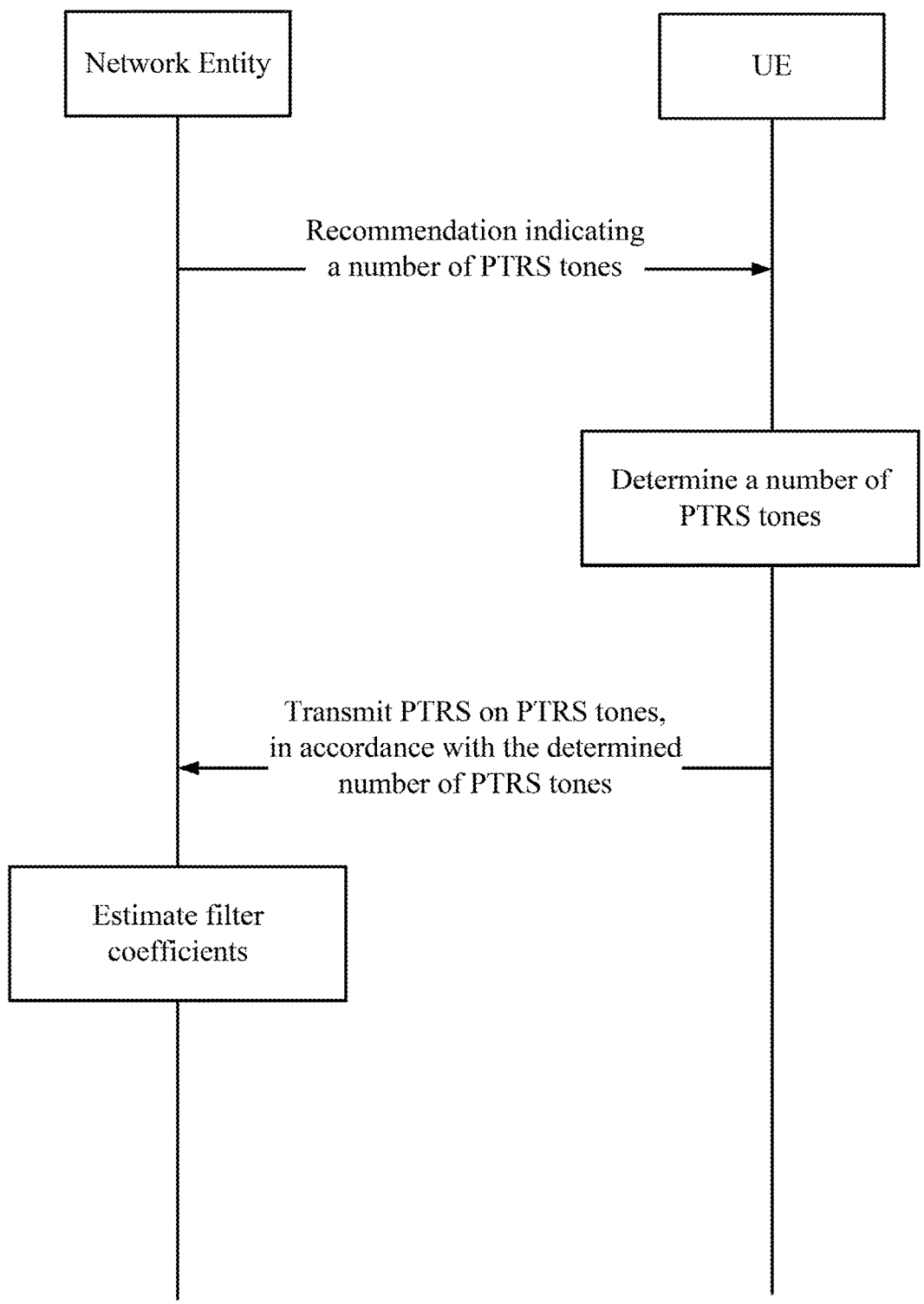
FIG. 21 is a call flow diagram illustrating a non-limiting example which supports using PTRS recommendations indicating a number of PTRS tones for ICI compensation in UL PTRS transmissions, in accordance with certain aspects of the present disclosure.
Figure 22:
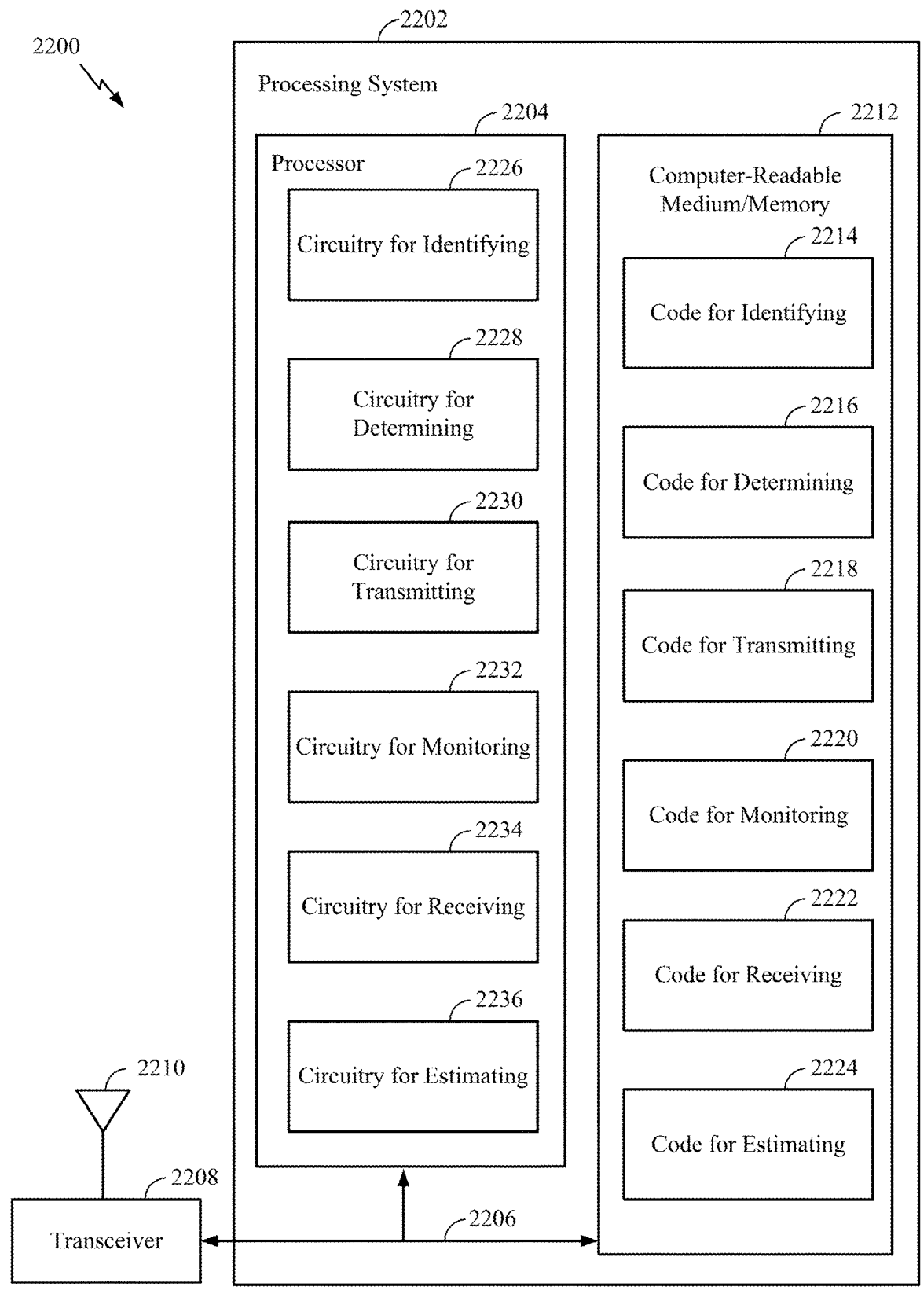
FIG. 22 illustrates a communications device that may include various components configured to perform operations for techniques disclosed herein, in accordance with certain aspects of the present disclosure.

Operations 1800 and 1900 of FIGS. 18 and 19, respectively may be understood with reference to example call flow diagrams 2000 and 2100 of FIGS. 21 and 22, respectively, that show examples of a network entity transmitting DL PTRS on a determined number of PTRS tones and a UE transmitting UL PTRS on a determined number of PTRS tones, respectively, in accordance with aspects of the present disclosure.

Figure 20:
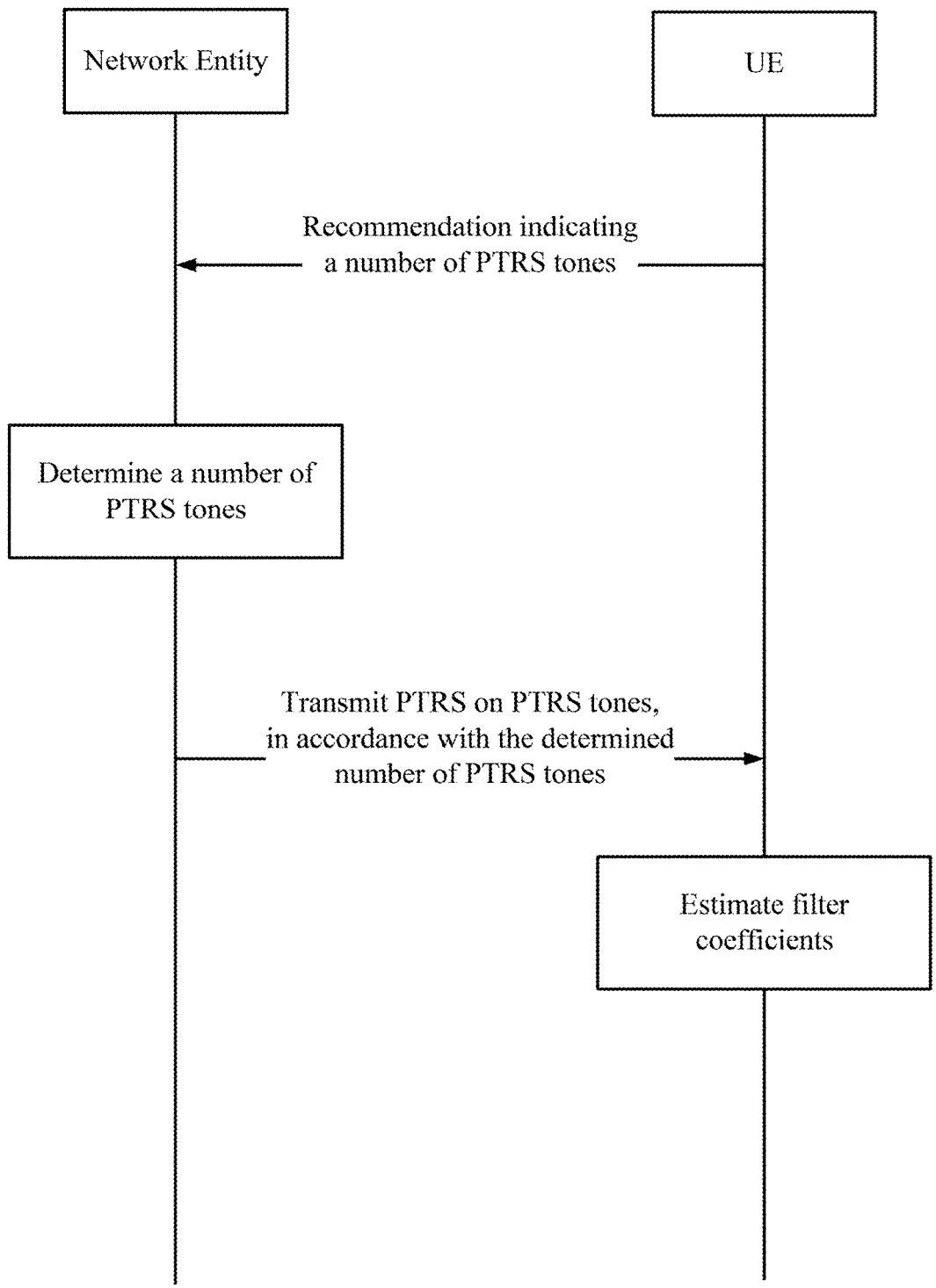
FIG. 20 is a call flow diagram illustrating a non-limiting example which supports using PTRS recommendations indicating a number of PTRS tones for ICI compensation in DL PTRS transmissions, in accordance with certain aspects of the present disclosure.

FIG. 20 is a call flow diagram illustrating a non-limiting example which supports using PTRS recommendations indicating a number of PTRS tones for ICI compensation in DL PTRS transmissions, in accordance with certain aspects of the present disclosure. As shown in FIG. 20, a UE may transmit (and a network entity may receive) a recommendation regarding PTRS tones. For example, the recommendation, from the UE, may include a recommended number of PTRS tones that are need to efficiently calculate filter coefficients in the de-ICI filter. The recommendation may be transmitted via RRC signaling.

Based on the recommendation, the network entity may determine a number of PTRS tones to transmit to the UE. In some examples, the determined number of tones to transmit may be uniformly distributed in the frequency domain. In some examples, the determined number of tones to transmit to the UE may not be uniformly distributed in the frequency domain. In some examples, the distribution of the PTRS tones may differ from one symbol to another symbol.

In some cases, the network entity may determine whether there are tones near the edge of the PDSCH allocation that contain the PTRS tones which may have a precoder shared by the PDSCH and are intended for another network entity. These adjacent tones may be used for ICI filter calculations, as well. Accordingly, the network entity may transmit these tones to the UE via medium access control (MAC) control element (CE) (MAC-CE) signaling comprising a downlink control information (DCI) carrying the determined tones.

Subsequently, the network entity may transmit (and the UE may receive) a PTRS on a determined number of PTRS tones.

Based on measurement of the PTRS on the PTRS tones, the UE may estimate filter coefficients for the de-ICI filter.

While the description of FIG. 20 refers to an example of transmitting a UL PTRS recommendation and a DL PTRS transmission, the process may also be used to send a DL PTRS recommendation and a UL PTRS transmission, as shown in FIG. 21.

FIG. 21 is a call flow diagram 2100 illustrating a non-limiting example which supports using PTRS recommendations indicating a number of PTRS tones for ICI compensation in UL PTRS transmissions, in accordance with certain aspects of the present disclosure. As shown, a network entity (e.g., gNB) may transmit (and a UE may receive) a recommendation regarding PTRS tones. For example, the recommendation, from the network entity, may include a recommended number of PTRS tones that are need to efficiently calculate filter coefficients in the de-ICI filter. The recommendation may be transmitted via RRC signaling.

Based on the recommendation, the UE may determine a number of PTRS tones to transmit. In some examples, the determined number of tones to transmit may be uniformly distributed in the frequency domain. In some examples, the determined number of tones to transmit may not be uniformly distributed in the frequency domain. In some examples, the distribution of the PTRS tones may differ from one symbol to another symbol.

In some cases, the UE may determine whether there are non-PTRS tones near the edge of the PTRS tones which may have a precoder shared by the PTRS tones and are intended for another UE. These non-PTRS tones may be used for ICI filter calculations, as well. Accordingly, the UE may transmit these non-PTRS tones to the network entity via MAC-CE signaling comprising a DCI carrying the determined non-PTRS tones.

Subsequently, the UE may transmit (and the network entity may receive) PTRS on a determined number of PTRS tones.

Based on measurement of the PTRS on the PTRS tones, the network entity may estimate filter coefficients for the de-ICI filter.

Example Wireless Communication Device

FIG. 22 illustrates a communications device 2200 that may include various components (e.g., corresponding to means-plus-function components) operable, configured, or adapted to perform operations for the techniques disclosed herein, such as the operations illustrated in FIGS. 10, 14, and 18. In some examples, communications device 2200 may be a first wireless node, such as a user equipment (UE) (e.g., UE 120a described with respect to FIGS. 1 and 2) or a network entity (e.g., BS 110a described with respect to FIGS. 1 and 2).

Communications device 2200 includes a processing system 2202 coupled to a transceiver 2208 (e.g., a transmitter and/or a receiver). Transceiver 2208 is configured to transmit and receive signals for communications device 2200 via an antenna 2210, such as the various signals as described herein. Processing system 2202 may be configured to perform processing functions for communications device 2200, including processing signals received and/or to be transmitted by communications device 2200.

Processing system 2202 includes a processor 2204 coupled to a computer-readable medium/memory 2212 via a bus 2206. In certain aspects, computer-readable medium/memory 2212 is configured to store instructions (e.g., computer-executable code) that when executed by processor 2204, cause processor 2204 to perform the operations illustrated in FIGS. 10, 14, and 18, or other operations for performing the various techniques discussed herein for enhancing PTRSs.

In certain aspects, computer-readable medium/memory 2212 stores code 2214 (an example means for) for identifying (identifying different patterns of PTRS tones to monitor for a PTRS); code 2216 (an example means for) for determining (e.g., for determining when to change at least one of the different patterns of the PTRS tones from one symbol to another); code 2218 (an example means for) for transmitting (e.g., for transmitting, to the second wireless node, a recommendation regarding the different patterns of the PTRS tones and/or for transmitting, to the second wireless node, a recommendation regarding a demodulation reference signal (DMRS) configuration); code 2220 (an example means for) for monitoring (e.g., for monitoring for one or more symbols of the PTRS, from a second wireless node, according to the determination); code 2222 (an example means for) for receiving (e.g., for receiving the PTRS, from the second wireless node, on the at least one of the different patterns of PTRS tones); code 2224 (an example means for) for estimating (e.g., for estimating filter coefficients for a de-ICI filter based on the PTRS received on the at least one of the different patterns of PTRS tones).

In certain aspects, processor 2204 has circuitry configured to implement the code stored in the computer-readable medium/memory 2212. Processor 2204 includes circuitry 2226 (an example means for) for identifying (e.g., for identifying different patterns of PTRS tones to monitor for a PTRS); circuitry 2228 (an example means for) for determining (e.g., determining when to change at least one of the different patterns of the PTRS tones from one symbol to another); circuitry 2230 (an example means for) for transmitting (e.g., for transmitting, to the second wireless node, a recommendation regarding the different patterns of the PTRS tones and/or for transmitting, to the second wireless node, a recommendation regarding a DMRS configuration); circuitry 2232 (an example means for) for monitoring (e.g., for monitoring for one or more symbols of the PTRS, from a second wireless node, according to the determination); circuitry 2234 (an example means for) for receiving (e.g., for receiving the PTRS, from the second wireless node, on the at least one of the different patterns of PTRS tones); and circuitry 2236 (an example means for) for estimating (e.g., for estimating filter coefficients for a de-ICI filter based on the PTRS received on the at least one of the different patterns of PTRS tones).

In some cases, the operations illustrated in FIGS. 10, 14, and 18, as well as other operations described herein, may be implemented by one or more means-plus-function components. For example, in some cases, such operations may be implemented by means for identifying, means for determining, means for transmitting, means for monitoring, means for receiving, and means for estimating.

In some cases, means for identifying, means for determining, means for monitoring, and means for estimating, includes a processing system, which may include one or more processors, such as receive processor 258, transmit processor 264, TX MIMO processor 266, and/or the controller/processor 280 of UE 120*a* illustrated in FIG. 2 and/or processing system 2202 of communications device 2200 in FIG. 22. In some cases, means for identifying, means for determining, means for monitoring, and means for estimating, includes a processing system, which may include one or more processors, such as receive processor 238, transmit processor 220, TX MIMO processor 230, and/or the controller/processor 240 of BS 110*a* illustrated in FIG. 2 and/or processing system 2202 of communications device 2200 in FIG. 22.

Transceiver 2208 may provide a means for receiving or transmitting information. Information may be passed on to other components of communications device 2200. Antenna 2210 may correspond to a single antenna or a set of antennas. Transceiver 2208 may provide means for transmitting signals generated by other components of communications device 2200.

In some cases, means for receiving or means for obtaining may include a receiver (such as receive processor 258) or antenna(s) 252 of UE 120*a* illustrated in FIG. 2. In some cases, means for receiving or means for obtaining may include a receiver (such as receive processor 238) or antenna(s) 234 of BS 110*a* illustrated in FIG. 2.

In some cases, means for transmitting or means for outputting may include a transmitter (such as the transmit processor 264) or antenna(s) 252 of UE 120*a* illustrated in FIG. 2. In some cases, means for transmitting or means for outputting may include a transmitter (such as the transmit processor 220) or antenna(s) 234 of BS 110*a* illustrated in FIG. 2.

Notably, FIG. 22 is just use one example, and many other examples and configurations of communications device 2200 are possible.

Figure 23:
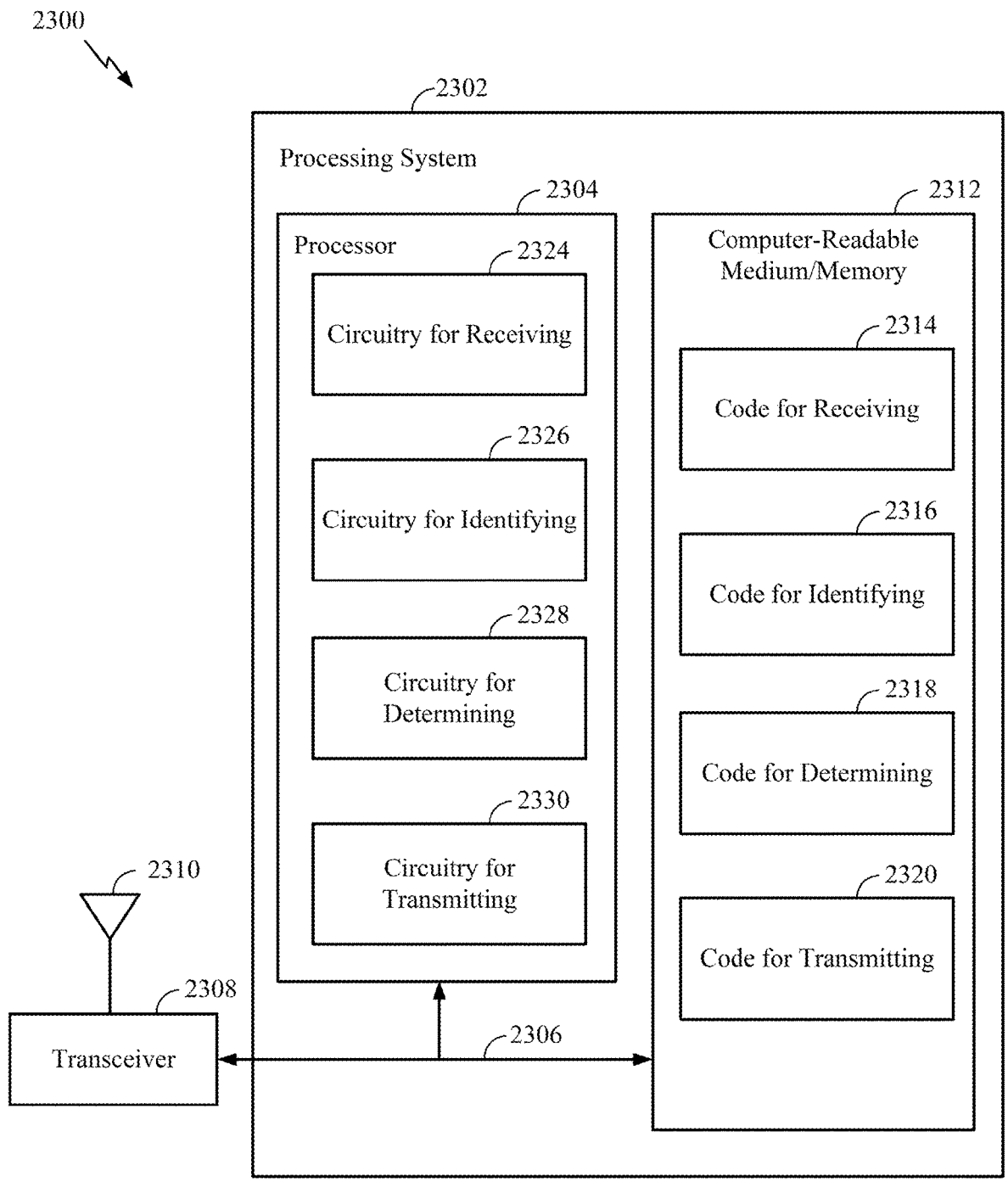
FIG. 23 illustrates a communications device that may include various components configured to perform operations for techniques disclosed herein, in accordance with certain aspects of the present disclosure.

FIG. 23 illustrates a communications device 2300 that may include various components (e.g., corresponding to means-plus-function components) operable, configured, or adapted, to perform operations for the techniques disclosed herein, such as the operations illustrated in FIGS. 11, 15, and 19. In some examples, communications device 2300 may be a first wireless node, such as a user equipment (UE) (e.g., UE 120*a* described with respect to FIGS. 1 and 2) or a network entity (e.g., BS 110*a* described with respect to FIGS. 1 and 2).

Communications device 2300 includes a processing system 2302 coupled to a transceiver 2308 (e.g., a transmitter and/or a receiver). Transceiver 2308 is configured to transmit and receive signals for communications device 2300 via an antenna 2310, such as the various signals as described herein. Processing system 2302 may be configured to perform processing functions for communications device 2300, including processing signals received and/or to be transmitted by communications device 2300.

Processing system 2302 includes a processor 2304 coupled to a computer-readable medium/memory 2312 via a bus 2306. In certain aspects, computer-readable medium/memory 2312 is configured to store instructions (e.g., computer-executable code) that when executed by processor 2304, cause processor 2304 to perform the operations illustrated in FIG. 1 FIGS. 11, 15, and 19, or other operations for performing the various techniques discussed herein for enhancing PTRSs.

In certain aspects, computer-readable medium/memory 2312 stores code 2314 (an example means for) for receiving (e.g., for receiving, from the second wireless node, a recommendation regarding the different patterns of the PTRS tones); code 2316 (an example means for) for identifying (e.g., for identifying different patterns of PTRS tones for transmitting a PTRS); code 2318 (an example means for) for determining (e.g., for determining when to change at least one of the different patterns of the PTRS tones from one symbol to another and/or for determining the location of at least the first PTRS tone in each of the different patterns of the PTRS tones based, at least in part, on at least one of: the first recommended offset for each of the different patterns of the PTRS tones; or the number of the PTRS tones for each of the different patterns of the PTRS tones and/or for determining an association between at least the first PTRS tone in each of the different patterns of the PTRS tones and a DMRS port in each of the different patterns of the PTRS tones and/or for determining a location of at least a second PTRS tone in each of the different patterns of the PTRS); and code 2320 (an example means for) for transmitting (e.g., for transmitting one or more symbols of the PTRS, to a second wireless node, according to the determination).

In certain aspects, processor 2304 has circuitry configured to implement the code stored in computer-readable medium/memory 2312. Processor 2304 includes circuitry 2324 (an example means for) for receiving (e.g., for receiving, from the second wireless node, a recommendation regarding the different patterns of the PTRS tones); circuitry 2326 (an example means for) for identifying (e.g., for identifying different patterns of PTRS tones for transmitting a PTRS); circuitry 2328 (an example means for) for determining (e.g., for determining when to change at least one of the different patterns of the PTRS tones from one symbol to another and/or for determining the location of at least the first PTRS tone in each of the different patterns of the PTRS tones based, at least in part, on at least one of: the first recommended offset for each of the different patterns of the PTRS tones; or the number of the PTRS tones for each of the different patterns of the PTRS tones and/or for determining an association between at least the first PTRS tone in each of the different patterns of the PTRS tones and a DMRS port in each of the different patterns of the PTRS tones and/or for determining a location of at least a second PTRS tone in each of the different patterns of the PTRS); and circuitry 2330 (an example means for) for transmitting (e.g., for transmitting one or more symbols of the PTRS, to a second wireless node, according to the determination).

In some cases, the operations illustrated in FIGS. 11, 15, and 19, as well as other operations described herein, may be implemented by one or more means-plus-function components. For example, in some cases, such operations may be implemented by means for receiving, means for identifying, means for determining, and means for transmitting.

In some cases, means for identifying and means for determining, includes a processing system, which may include one or more processors, such as receive processor 258, transmit processor 264, TX MIMO processor 266, and/or the controller/processor 280 of UE 120*a* illustrated in FIG. 2 and/or processing system 2302 of communications device 2300 in FIG. 23. In some cases, means for identifying and means for determining, includes a processing system, which may include one or more processors, such as receive processor 238, transmit processor 220, TX MIMO processor 230, and/or the controller/processor 240 of BS 110*a* illustrated in FIG. 2 and/or processing system 2302 of communications device 2300 in FIG. 23.

Transceiver 2308 may provide a means for receiving or transmitting information. Information may be passed on to other components of communications device 2300. Antenna 2310 may correspond to a single antenna or a set of antennas. Transceiver 2308 may provide means for transmitting signals generated by other components of communications device 2300.

In some cases, means for receiving or means for obtaining may include a receiver (such as receive processor 258) or antenna(s) 252 of UE 120a illustrated in FIG. 2. In some cases, means for receiving or means for obtaining may include a receiver (such as receive processor 238) or antenna(s) 234 of BS 110a illustrated in FIG. 2.

In some cases, means for transmitting or means for outputting may include a transmitter (such as the transmit processor 264) or antenna(s) 252 of UE 120a illustrated in FIG. 2. In some cases, means for transmitting or means for outputting may include a transmitter (such as the transmit processor 220) or antenna(s) 234 of BS 110a illustrated in FIG. 2.

Notably, FIG. 23 is just use one example, and many other examples and configurations of communications device 2300 are possible.

PTRS manager 122 and PTRS manager 112 may support wireless communication in accordance with examples as disclosed herein.

PTRS manager 122 and PTRS manager 112 may be an example of means for performing various aspects described herein. PTRS manager 122 and PTRS manager 112, or its sub-components, may be implemented in hardware (e.g., in UL resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, PTRS manager 122 and PTRS manager 112, or its sub-components, may be implemented in code (e.g., as configuration management software or firmware) executed by a processor, or any combination thereof. If implemented in code executed by a processor, the functions of PTRS manager 122 and PTRS manager 112, or its sub-components may be executed by a general-purpose processor, a DSP, an ASIC, a FPGA or other programmable logic device.

In some examples, PTRS manager 122 and PTRS manager 112 may be configured to perform various operations (e.g., receiving, determining, transmitting/sending) using or otherwise in cooperation with the transceiver 1508 or 1608.

PTRS manager 122 and PTRS manager 112, or its sub-components, may be physically located at various positions, including being distributed such that portions of functions are implemented at different physical locations by one or more physical components. In some examples, PTRS manager 122 and PTRS manager 112, or its sub-components, may be a separate and distinct component in accordance with various aspects of the present disclosure. In some examples, PTRS manager 122 and PTRS manager 112, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Clauses

Implementation examples are described in the following numbered clauses:

Clause 1: A method of wireless communications by a first wireless node, comprising: identifying different patterns of phase tracking reference signal (PTRS) tones to monitor for a PTRS; determining when to change at least one of the different patterns of the PTRS tones from one symbol to another; and monitoring for one or more symbols of the PTRS, from a second wireless node, according to the determination.

Clause 2: The method of Clause 1, further comprising: receiving the PTRS, from the second wireless node, on the at least one of the different patterns of PTRS tones; and estimating filter coefficients for a de-intercarrier interference (de-ICI) filter based on the PTRS received on the at least one of the different patterns of PTRS tones.

Clause 3: The method of Clause 2, wherein the first wireless node receives the PTRS, from the second wireless node over at least two ports of the at least one of the different patterns of PTRS tones.

Clause 4: The method of any of Clauses 1-3, wherein the different patterns comprise: one or more block PTRS patterns with at least one set of contiguous PTRS tones, or one or more PTRS patterns with discontiguous sets of one or more PTRS tones.

Clause 5: The method of any of Clauses 1-4, further comprising transmitting, to the second wireless node, a recommendation regarding the different patterns of the PTRS tones.

Clause 6: The method of Clause 5, wherein the recommendation indicates a specific mixture of at least two of the different patterns of the PTRS tones.

Clause 7: The method of Clause 5 or 6, wherein the recommendation implicitly indicates the different patterns of the PTRS tones.

Clause 8: The method of Clause 7, wherein the recommendation indicates one or more types of compensation algorithms that implicitly indicate the different patterns.

Clause 9: The method of any of Clauses 5-8, wherein the recommendation indicates at least one of: a recommended offset for each of the different patterns of the PTRS tones for use in determining a location of at least a first PTRS tone in each of the different patterns; or a number of PTRS tones for each of the different patterns of the PTRS tones for use in determining the location of at least the first PTRS tone in each of the different patterns of the PTRS tones.

Clause 10: The method of Clause 9, wherein the recommended offset for use in determining the location of at least the first PTRS tone in each of the different patterns of PTRS tones varies from one symbol to another.

Clause 11: The method of Clause 9 or 10, wherein, for a given symbol, the recommended offset is, at least one of: based on a deterministic shift from the one symbol to the other; or being configured via network signaling.

Clause 12: The method of any of Clauses 5-11, wherein the recommendation also indicates a filter length.

Clause 13: The method of any of Clauses 1-12, wherein the determination of when to change the at least one of the different patterns of the PTRS tones is predefined or configured via network signaling.

Clause 14: The method of any of Clauses 1-13, wherein at least some of the PTRS tones of one or more of the different patterns of the PTRS tones are aligned with one or more demodulation reference signal (DMRS) port tones.

Clause 15: The method of any of Clauses 1-14, further comprising transmitting, to the second wireless node, a recommendation regarding a demodulation reference signal (DMRS) configuration.

Clause 16: The method of Clause 15, wherein the recommendation indicates at least one of: subcarrier spacing (SCS) for the DMRS configuration; or whether or not frequency division multiplexing between DMRS ports is recommended.

Clause 17: A method of wireless communications by a first wireless node, comprising: identifying different patterns of phase tracking reference signal (PTRS) tones for transmitting a PTRS; determining when to change at least one of the different patterns of the PTRS tones from one symbol to another; and transmitting one or more symbols of the PTRS, to a second wireless node, according to the determination.

Clause 18: The method of Clause 17, wherein the different patterns comprise: one or more block PTRS patterns with at least one set of contiguous PTRS tones, or one or more PTRS patterns with discontiguous sets of one or more PTRS tones.

Clause 19: The method of Clause 17 or 18, further comprising: receiving, from the second wireless node, a recommendation regarding the different patterns of the PTRS tones; and identifying the different patterns of the PTRS tones based, at least in part, on the recommendation.

Clause 20: The method of Clause 19, wherein the recommendation indicates a specific mixture of at least two of the different patterns of the PTRS tones.

Clause 21: The method of Clause 19 or 20, wherein the recommendation implicitly indicates the different patterns of the PTRS tones.

Clause 22: The method of Clause 21, wherein the recommendation indicates one or more types of compensation algorithms that implicitly indicate the different patterns of the PTRS tones.

Clause 23: The method of any of Clauses 19-22, wherein the recommendation indicates at least one of: a first recommended offset for each of the different patterns of the PTRS tones for use in determining a location of at least a first PTRS tone in each of the different patterns of the PTRS tones; or a number of PTRS tones for each of the different patterns of the PTRS tones for use in determining the location of at least the first PTRS tone in each of the different patterns of the PTRS tones.

Clause 24: The method of Clause 23, further comprising: determining the location of at least the first PTRS tone in each of the different patterns of the PTRS tones based, at least in part, on at least one of: the first recommended offset for each of the different patterns of the PTRS tones; or the number of the PTRS tones for each of the different patterns of the PTRS tones; and wherein transmitting the one or more symbols of the PTRS, to the second wireless node, according to the determination of when to change the at least one of the different patterns of the PTRS tones from one symbol to another comprises transmitting the PTRS on at least the first PTRS tone in each of the different patterns of the PTRS tones according to the determination of when to change the at least one of the different patterns of the PTRS tones.

Clause 25: The method of Clause 24, further comprising: determining an association between at least the first PTRS tone in each of the different patterns of the PTRS tones and a demodulation reference signal (DMRS) port in each of the different patterns of the PTRS tones, wherein the location of at least the first PTRS tone in each of the different patterns of the PTRS tones is determined based also on the association.

Clause 26: The method of Clause 24 or 25, wherein determining the location of at least the first PTRS tone in each of the different patterns of the PTRS tones comprises aligning the first PTRS tone in each of the different patterns of the PTRS tones with a DMRS tone of the associated DMRS port in each of the different patterns of the PTRS tones with a resource element (RE) index greater than or equal to the first recommended offset for each of the different patterns of the PTRS tones.

Clause 27: The method of any of Clauses 23-26, wherein the first recommended offset for use in determining the location of at least the first PTRS tone in each of the different patterns of the PTRS tones varies from one symbol to another.

Clause 28: The method of any of Clauses 23-27, further comprising: determining a location of at least a second PTRS tone in each of the different patterns of the PTRS tones based, at least in part, on the first recommended offset or a second recommended offset for each of the different patterns of the PTRS tones, wherein the determined location for the second PTRS tone in each of the different patterns of the PTRS tones is not the determined location for the first PTRS tone in each of the different patterns of the PTRS tones; and wherein transmitting the one or more symbols of the PTRS, to the second wireless node, according to the determination of when to change the at least one of the different patterns of the PTRS tones from one symbol to another comprises transmitting the PTRS over at least two ports on one or more PTRS tones in each of the different patterns of the PTRS tones according to the determination of when to change the at least one of the different patterns of the PTRS tones, wherein the at least two ports include the first PTRS tone over a first port and the second PTRS tone over a second port each of the different patterns of the PTRS tones, in accordance with the respective determinations.

Clause 29: An apparatus, comprising: at least one processor; and a memory coupled to the at least one processor, the memory including instructions executable by the at least one processor to cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering. For example, processors 258, 264 and 266, and/or controller/processor 280 of the UE 120*a* and/or processors 220, 230, 238, and/or controller/processor 240 of the BS 110*a* shown in FIG. 2 may be configured to perform operations of FIGS. 10-21.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for identifying, means for determining and means for monitoring may include a processing system, which may include one or more processors, such as processors 258, 264 and 266, and/or controller/processor 280 of the UE 120*a* and/or processors 220, 230, 238, and/or controller/processor 240 of the BS 110*a* shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 10, 11, 14, 15, 18, and 19.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communications by a first wireless node, comprising:
   identifying different patterns of phase tracking reference signal (PTRS) tones to monitor for a PTRS;
   determining when to change at least one of the different patterns of the PTRS tones from one symbol of a slot to another symbol of the slot; and
   monitoring for the PTRS, from a second wireless node, according to the determination.

2. The method of claim 1, further comprising:
   receiving the PTRS, from the second wireless node, on the at least one of the different patterns of PTRS tones; and
   estimating filter coefficients for a de-intercarrier interference (de-ICI) filter based on the PTRS received on the at least one of the different patterns of PTRS tones.

3. The method of claim 2, wherein the first wireless node receives the PTRS, from the second wireless node over at least two ports of the at least one of the different patterns of PTRS tones.

4. The method of claim 1, wherein the different patterns comprise:
   one or more block PTRS patterns with at least one set of contiguous PTRS tones, or
   one or more PTRS patterns with discontiguous sets of one or more PTRS tones.

5. The method of claim 1, further comprising transmitting, to the second wireless node, a recommendation regarding the different patterns of the PTRS tones.

6. The method of claim 5, wherein the recommendation indicates a specific mixture of at least two of the different patterns of the PTRS tones.

7. The method of claim 5, wherein the recommendation implicitly indicates the different patterns of the PTRS tones.

8. The method of claim 7, wherein the recommendation indicates one or more types of compensation algorithms that implicitly indicate the different patterns.

9. The method of claim 5, wherein the recommendation indicates at least one of:
   a recommended offset for each of the different patterns of the PTRS tones for use in determining a location of at least a first PTRS tone in each of the different patterns; or
   a number of PTRS tones for each of the different patterns of the PTRS tones for use in determining the location of at least the first PTRS tone in each of the different patterns of the PTRS tones.

10. The method of claim 9, wherein the recommended offset for use in determining the location of at least the first PTRS tone in each of the different patterns of PTRS tones varies from the one symbol of the slot to the other symbol of the slot.

11. The method of claim 9, wherein, for a given symbol, the recommended offset is, at least one of:
    based on a deterministic shift from the one symbol to the other symbol; or
    being configured via network signaling.

12. The method of claim 5, wherein the recommendation also indicates a filter length.

13. The method of claim 1, wherein the determination of when to change the at least one of the different patterns of the PTRS tones is predefined or configured via network signaling.

14. The method of claim 1, wherein at least some of the PTRS tones of one or more of the different patterns of the PTRS tones are aligned with one or more demodulation reference signal (DMRS) port tones.

15. The method of claim 1, further comprising transmitting, to the second wireless node, a recommendation regarding a demodulation reference signal (DMRS) configuration.

16. The method of claim 15, wherein the recommendation indicates at least one of:
    subcarrier spacing (SCS) for the DMRS configuration; or
    whether or not frequency division multiplexing between DMRS ports is recommended.

17. A method of wireless communications by a first wireless node, comprising:
    identifying different patterns of phase tracking reference signal (PTRS) tones for transmitting a PTRS;
    determining when to change at least one of the different patterns of the PTRS tones from one symbol of a slot to another symbol of the slot; and
    transmitting the PTRS, to a second wireless node, according to the determination.

18. The method of claim 17, wherein the different patterns comprise:
    one or more block PTRS patterns with at least one set of contiguous PTRS tones, or
    one or more PTRS patterns with discontiguous sets of one or more PTRS tones.

19. The method of claim 17, further comprising:
receiving, from the second wireless node, a recommendation regarding the different patterns of the PTRS tones; and
identifying the different patterns of the PTRS tones based, at least in part, on the recommendation.

20. The method of claim 19, wherein the recommendation indicates a specific mixture of at least two of the different patterns of the PTRS tones.

21. The method of claim 19, wherein the recommendation implicitly indicates the different patterns of the PTRS tones.

22. The method of claim 21, wherein the recommendation indicates one or more types of compensation algorithms that implicitly indicate the different patterns of the PTRS tones.

23. The method of claim 19, wherein the recommendation indicates at least one of:
a first recommended offset for each of the different patterns of the PTRS tones for use in determining a location of at least a first PTRS tone in each of the different patterns of the PTRS tones; or
a number of PTRS tones for each of the different patterns of the PTRS tones for use in determining the location of at least the first PTRS tone in each of the different patterns of the PTRS tones.

24. The method of claim 23, further comprising:
determining the location of at least the first PTRS tone in each of the different patterns of the PTRS tones based, at least in part, on at least one of:
the first recommended offset for each of the different patterns of the PTRS tones; or
the number of the PTRS tones for each of the different patterns of the PTRS tones; and
wherein transmitting the PTRS, to the second wireless node, according to the determination of when to change the at least one of the different patterns of the PTRS tones from the one symbol of the slot to the other symbol of the slot comprises transmitting the PTRS on at least the first PTRS tone in each of the different patterns of the PTRS tones according to the determination of when to change the at least one of the different patterns of the PTRS tones.

25. The method of claim 24, further comprising:
determining an association between at least the first PTRS tone in each of the different patterns of the PTRS tones and a demodulation reference signal (DMRS) port in each of the different patterns of the PTRS tones, wherein the location of at least the first PTRS tone in each of the different patterns of the PTRS tones is determined based also on the association.

26. The method of claim 25, wherein determining the location of at least the first PTRS tone in each of the different patterns of the PTRS tones comprises aligning the first PTRS tone in each of the different patterns of the PTRS tones with a DMRS tone of the DMRS port in each of the different patterns of the PTRS tones associated with at least the first PTRS tone in each of the different patterns of the PTRS tones with a resource element (RE) index greater than or equal to the first recommended offset for each of the different patterns of the PTRS tones.

27. The method of claim 23, wherein the first recommended offset for use in determining the location of at least the first PTRS tone in each of the different patterns of the PTRS tones varies from the one symbol of the slot to the other symbol of the slot.

28. The method of claim 23, further comprising:
determining a location of at least a second PTRS tone in each of the different patterns of the PTRS tones based, at least in part, on the first recommended offset or a second recommended offset for each of the different patterns of the PTRS tones, wherein the determined location for the second PTRS tone in each of the different patterns of the PTRS tones is not the determined location for the first PTRS tone in each of the different patterns of the PTRS tones; and
wherein transmitting the PTRS, to the second wireless node, according to the determination of when to change the at least one of the different patterns of the PTRS tones from the one symbol of the slot to the other symbol of the slot comprises transmitting the PTRS over at least two ports on one or more PTRS tones in each of the different patterns of the PTRS tones according to the determination of when to change the at least one of the different patterns of the PTRS tones, wherein the at least two ports include the first PTRS tone over a first port and the second PTRS tone over a second port each of the different patterns of the PTRS tones, in accordance with the respective determinations.

29. An apparatus for wireless communication by a first wireless node, comprising:
a memory; and
one or more processors coupled to the memory, the one or more processors, individually or collectively, are configured to:
identify different patterns of phase tracking reference signal (PTRS) tones for receiving a PTRS;
determine when to change at least one of the different patterns of the PTRS tones from one symbol of a slot to another of the slot; and
monitor for the PTRS, from a second wireless node, according to the determination.

30. The apparatus of claim 29, wherein the one or more processors, individually or collectively, are further configured to:
receive the PTRS, from the second wireless node, on the at least one of the different patterns of PTRS tones; and
estimate filter coefficients for a de-intercarrier interference (de-ICI) filter based on the PTRS received on the at least one of the different patterns of PTRS tones.

31. The apparatus of claim 30, wherein the first wireless node is configured to receive the PTRS, from the second wireless node over at least two ports of the at least one of the different patterns of PTRS tones.

32. The apparatus of claim 29, wherein the different patterns comprise:
one or more block PTRS patterns with at least one set of contiguous PTRS tones, or
one or more PTRS patterns with discontiguous sets of one or more PTRS tones.

33. The apparatus of claim 29, wherein the one or more processors, individually or collectively, are further configured to transmit, to the second wireless node, a recommendation regarding the different patterns of the PTRS tones.

34. The apparatus of claim 33, wherein the recommendation indicates a specific mixture of at least two of the different patterns of the PTRS tones.

35. The apparatus of claim 33, wherein the recommendation implicitly indicates the different patterns of the PTRS tones.

36. The apparatus of claim 35, wherein the recommendation indicates one or more types of compensation algorithms that implicitly indicate the different patterns.

37. The apparatus of claim 33, wherein the recommendation indicates at least one of:

a recommended offset for each of the different patterns of the PTRS tones for use in determining a location of at least a first PTRS tone in each of the different patterns; or a number of PTRS tones for each of the different patterns of the PTRS tones for use in determining the location of at least the first PTRS tone in each of the different patterns of the PTRS tones.

38. The apparatus of claim 37, wherein the recommended offset for use in determining the location of at least the first PTRS tone in each of the different patterns of PTRS tones varies from the one symbol of the slot to the other symbol of the slot.

39. The apparatus of claim 37, wherein, for a given symbol, the recommended offset is, at least one of:
based on a deterministic shift from the one symbol to the other symbol; or
being configured via network signaling.

40. The apparatus of claim 33, wherein the recommendation also indicates a filter length.

41. The apparatus of claim 29, wherein the one or more processors, individually or collectively, are configured to determine when to change the at least one of the different patterns of the PTRS tones as predefined or configured via network signaling.

42. The apparatus of claim 29, wherein at least some of the PTRS tones of one or more of the different patterns of the PTRS tones are aligned with one or more demodulation reference signal (DMRS) port tones.

43. The apparatus of claim 29, wherein the one or more processors, individually or collectively, are further configured to transmit, to the second wireless node, a recommendation regarding a demodulation reference signal (DMRS) configuration.

44. The apparatus of claim 43, wherein the recommendation indicates at least one of:
subcarrier spacing (SCS) for the DMRS configuration; or
whether or not frequency division multiplexing between DMRS ports is recommended.

45. An apparatus for wireless communication by a first wireless node, comprising:
a memory; and
one or more processors coupled to the memory, wherein the one or more processors, individually or collectively, are configured to:
identify different patterns of phase tracking reference signal (PTRS) tones for transmitting a PTRS;
determine when to change at least one of the different patterns of the PTRS tones from one symbol of a slot to another symbol of the slot; and
transmit the PTRS, to a second wireless node, according to the determination.

46. The apparatus of claim 45, wherein the different patterns comprise:
one or more block PTRS patterns with at least one set of contiguous PTRS tones, or
one or more PTRS patterns with discontiguous sets of one or more PTRS tones.

47. The apparatus of claim 45, wherein the one or more processors, individually or collectively, are further configured to:
receive, from the second wireless node, a recommendation regarding the different patterns of the PTRS tones; and
identify the different patterns of the PTRS tones based, at least in part, on the recommendation.

48. The apparatus of claim 47, wherein the recommendation indicates a specific mixture of at least two of the different patterns of the PTRS tones.

49. The apparatus of claim 47, wherein the recommendation implicitly indicates the different patterns of the PTRS tones.

50. The apparatus of claim 49, wherein the recommendation indicates one or more types of compensation algorithms that implicitly indicate the different patterns of the PTRS tones.

* * * * *